US011261761B2

(12) United States Patent
Jang

(10) Patent No.: US 11,261,761 B2
(45) Date of Patent: Mar. 1, 2022

(54) ENERGY REAL-TIME OPTIMIZER FOR STEAM AND CONDENSATION BALANCE USING GAMS

(71) Applicant: Saudi Arabian Oil Company, Dhahran (SA)

(72) Inventor: Youngghee Jang, Ras Tanura (SA)

(73) Assignee: Saudi Arabian Oil Company, Dhahran (SA)

( * ) Notice: Subject to any disclaimer, the term of this patent is extended or adjusted under 35 U.S.C. 154(b) by 161 days.

(21) Appl. No.: 16/702,900

(22) Filed: Dec. 4, 2019

(65) Prior Publication Data

US 2021/0108539 A1 Apr. 15, 2021

Related U.S. Application Data

(60) Provisional application No. 62/914,821, filed on Oct. 14, 2019.

(51) Int. Cl.
*F01K 13/02* (2006.01)
*G06F 30/20* (2020.01)

(52) U.S. Cl.
CPC .............. *F01K 13/02* (2013.01); *G06F 30/20* (2020.01); *F05B 2270/20* (2013.01)

(58) Field of Classification Search
CPC ..... F01K 13/02; F05B 2270/20; G05B 17/02; G06F 2119/06; G06F 30/20
See application file for complete search history.

(56) References Cited

U.S. PATENT DOCUMENTS 6,681,155 B1 1/2004 Fujita et al.
8,359,124 B2 1/2013 Zhou et al.
8,600,717 B2 12/2013 Rashid et al.
(Continued)

FOREIGN PATENT DOCUMENTS

CN 106208157 12/2016
EP 0731397 5/2001
KR 20130122432 A * 11/2013

OTHER PUBLICATIONS

Han et al., Modeling and Optimization of the Condensing Steam Turbine Network of a Chemical Plant, 2006, Department of Chemical Engineering, Pohang University of Science and Technology et al., pp. 670-680. (Year: 2006).*
(Continued)

*Primary Examiner* — Kidest Bahta
(74) *Attorney, Agent, or Firm* — Fish & Richardson P.C.

(57) ABSTRACT

Systems and methods include a method for optimizing real-time energy use, including balancing steam and condensate. Real-time equipment readings are received from plural pieces of equipment at a facility. A steam and condensate balancing model is executed using the real-time equipment readings. The steam and condensate balancing model uses specialized optimizer engine code to balance steam output and condensate output. A set-point optimization model is executed with selection optimization turned off to identify optimum values for boilers, STGs, letdowns, and deaerators. The set-point optimization model is executed with selection optimization turned on to identify optimized settings for drivers of turbines and motors. Setting updates are provided to the plural pieces of equipment based on the executing.

20 Claims, 27 Drawing Sheets

(56) References Cited

U.S. PATENT DOCUMENTS

| | | | |
|---|---|---|---|
| 2006/0178782 A1* | 8/2006 | Pechtl | G05B 13/024 |
| | | | 700/286 |
| 2011/0236842 A1* | 9/2011 | Ecock | F24D 10/00 |
| | | | 432/1 |
| 2013/0282184 A1 | 10/2013 | Noureldin et al. | |
| 2018/0028934 A1 | 2/2018 | Crawford et al. | |

OTHER PUBLICATIONS

US Department of energy, improving Steam System Performance, 2004, IUS Department of energy, p. 1-59. (Year: 2004).*

PCT International Search Report and Written Opinion in International Appln. No. PCT/US2020/055421, dated Feb. 3, 2021, 12 pages.

aspentech.com [online], retrieved from URL: <https://www.aspentech.com>, available on or before Jul. 2019, retrieved on Dec. 16, 2019, 5 pages.

kbc.global [online], retrieved from URL <https://www.kbc.global/>, available on or before Jul. 2019, retrieved on Dec. 16, 2019, 7 pages.

processint.com [online], retrieved from URL <http://www.processint.com>, available on or before Jul. 2019, retrieved on Dec. 16, 2019, 5 pages.

psenter.com [online], retrieved from URL <https://www.psenterprise.com>, available on or before Jul. 2019, retrieved on Dec. 16, 2019, 3 pages.

Ras Tanura Refinery "Energy Real-Time Optimizer—Steam & Condensate Balance," RT Refinery Engineering Departments, Jan. 2019.

\* cited by examiner

FIG. 3A

TABLE TBNMTR (DRIVERS, ITEMS) 750

| | HS | MS | LS | LLS | MW | RUN | TBN | MIN | MAX | HM | HL | HLL | ML | O |
|---|---|---|---|---|---|---|---|---|---|---|---|---|---|---|
| J93-K10X | 53 | -53 | 0 | 0 | 0.969 | 3 | 2 | 1 | 2 | 1 | 0 | 0 | 0 | |
| J93-K20X | 53 | -53 | 0 | 0 | 0.969 | 3 | 2 | 1 | 2 | 1 | 0 | 0 | 0 | |
| 488-G304 | 12 | -12 | 0 | 0 | 0.150 | 1 | 1 | 1 | 1 | 1 | 0 | 0 | 0 | |
| 488-G307 | 18 | -18 | 0 | 0 | 0.224 | 1 | 1 | 1 | 1 | 1 | 0 | 0 | 0 | |
| 493-G304 | 14 | -14 | 0 | 0 | 0.150 | 1 | 1 | 1 | 1 | 1 | 0 | 0 | 0 | |
| 493-G307 | 21 | -21 | 0 | 0 | 0.224 | 1 | 1 | 1 | 1 | 1 | 0 | 0 | 0 | |
| J24-G102 | 0 | 8 | -8 | 0 | 0.082 | 1 | 1 | 0 | 1 | 0 | 0 | 0 | 1 | |
| J24-G202 | 0 | 20 | -20 | 0 | 0.172 | 1 | 1 | 0 | 1 | 0 | 0 | 0 | 1 | |
| J24-G304 | 0 | 14 | -14 | 0 | 0.104 | 1 | 1 | 0 | 1 | 0 | 0 | 0 | 1 | |
| J80-G310 | 0 | 31 | -31 | 0 | 0.224 | 1 | 1 | 0 | 1 | 0 | 0 | 0 | 1 | |
| J80-G320 | 0 | 25 | -25 | 0 | 0.145 | 1 | 1 | 0 | 1 | 0 | 0 | 0 | 1 | |
| J80-G324 | 0 | 17 | -17 | 0 | 0.164 | 1 | 1 | 0 | 1 | 0 | 0 | 0 | 1 | |
| 015-G103 | 10 | 0 | -10 | 0 | 0.185 | 1 | 1 | 0 | 1 | 0 | 1 | 0 | 1 | |
| 015-G125 | 6 | 0 | -6 | 0 | 0.112 | 1 | 1 | 0 | 1 | 0 | 1 | 0 | 1 | |
| 015-G206 | 10 | 0 | -10 | 0 | 0.270 | 2 | 1 | 0 | 1 | 0 | 1 | 0 | 1 | |
| 015-G260 | 35 | 0 | -35 | 0 | 1.060 | 1 | 1 | 0 | 1 | 0 | 1 | 0 | 1 | |
| J85-G101 | 17 | 0 | -17 | 0 | 0.495 | 1 | 1 | 0 | 1 | 0 | 1 | 0 | 0 | |
| J85-G103 | 20 | 0 | -20 | 0 | 0.450 | 2 | 2 | 1 | 2 | 0 | 0 | 0 | 0 | |
| 030-CW | 30 | 0 | 0 | -30 | 1.230 | 3 | 1 | 1 | 2 | 0 | 0 | 1 | 0 | 0 |

FIG. 7B

```
IDE  gamside: D:\Users\jangyx\Documents\gamsdir\projdir\gmsproj.gpr - [D:\rtrerto\rtrerto.gms]
IDE  File  Edit  Search  Windows  Utilities  Model Libraries  Help rtrerto.gms  |  rtrerto.lst eqn129.. cal_mw_stg =g= mw_energy;
// DW and SC
eqn131.. cal_ms_med =e= var_dw_makeup * ms_dw_med;
eqn132.. cal_bw_blr =e= var_hs_blr * bw_hs_blr;
eqn133.. cal_hbw_user1 =e= cal_bw_blr + bw_cogen1 + bw_cogen2;
eqn134.. cal_sc_recovery =e= sc_other + (var_ls_vc + var_lls_vc + var_sc_stg1 + var_sc_stg4) ;
eqn135.. cal_ls_deaerator =e= (lbw_user + cal_bw_blr + bw_cogen1 + bw_cogen2 + hbw_user2) * 0.13;
// Fuel
eqn136.. cal_fg_blr_heat =e= var_hs_blr * 1.1 / 0.88;
// Balance
eqn141.. (var_hs_blr + hs_cogen1 + hs_cogen2 + hs_whb) =e= (var_hs_stg1 + var_hs_stg2 + var_hs_stg4 + hs_sc_maintbn + hs_ls_maintbn + hs_ms_tbnmtr +
eqn142.. (var_ms_stg1 + var_ms_stg2 + var_ms_ls_bos + hs_ms_tbnmtr + var_hs_ms_bos + ms_whb) =e= (var_ms_ls_bos + ms_ls_tbnmtr + ms_lls_tbnmtr + ms_
eqn143.. (var_hs_ls_bos + var_ms_ls_bos + hs_ls_maintbn + ms_ls_tbnmtr + hs_ls_tbnmtr + ms_lls_tbnmtr + ls_whb) =e= (var_ls_lls_bos + var_ls_vc + cal_ls_deaerator + ls_use
eqn144.. (var_lls_stg1 + var_lls_stg4 + var_lls_bos + hs_lls_tbnmtr) =e= (var_lls_vc + lls_user) + lls_bal;
eqn145.. (var_dw_makeup + cal_ls_recovery + cal_ls_deaerator) =e= (pw_user + lbw_user + cal_bw_blr + bw_cogen1 + bw_cogen2 + hbw_user2) + sc_bal;
eqn151.. (var_fg_gart_heat + fg_rog_heat) =e= (fg_rtr_heat + cal_fg_blr_heat + fg_rpg_heat) + fg_bal;
eqn161.. (mw_cogen1 + mw_cogen2 + cal_mw_stg1 + cal_mw_stg2 + cal_mw_stg4) =e= (mw_rtr + mw_rtt + mw_rtsc + var_mw_sec) + mw_bal;
// Cost
eqn171.. cal_cost_fg =e= (fg_cost * (fg_rtr_heat + cal_fg_blr_heat) / 1000;
eqn172.. cal_cost_hs =e= (hs_cost * (hs_cogen1 + hs_cogen2) ) / 1000;
eqn173.. cal_cost_dw =e= (dw_cost * (var_dw_makeup - pw_sales) ) / 1000;
eqn174.. cal_cost_mw =e= (mw_cost * (mw_rtr)) / 1000;
eqn175.. cal_margin =e= costs - cal_costs;
```

ENERGY REAL-TIME OPTIMIZER FOR STEAM AND CONDENSATION BALANCE USING GAMS

CROSS-REFERENCE TO RELATED APPLICATIONS

This application is a conversion of Provisional Application No. 62/914,821, filed on Oct. 14, 2019, and is hereby incorporated by reference in its entirety.

BACKGROUND

The present disclosure applies to monitoring the use of equipment at a facility. For example, at a facility that uses natural gas, various pieces of equipment are typically present. The equipment can include, for example, boilers, steam turbine generators (STGs), waste heat boilers, main steam turbines, switchable steam turbine and motor sets, deaerators, and equipment associated with fuel balance, steam balance, condensate balance, and power balance. Some commercial products that are available to monitor such equipment may have high project and annual maintenance costs.

SUMMARY

The present disclosure describes techniques that can be used to optimize real-time energy use, including balancing steam and condensate, using a general algebraic modeling system (GAMS) optimizer. For example, an energy real-time optimizer (ERTO) can be used to monitor an entire energy network and provide real-time optimization solutions in order to reduce operating costs and to increase economic benefits. The term real-time can correspond, for example, to events that occur within a specified period of time, such as within one day, within one hour, or within minutes. The events can include, for example, equipment readings and subsequent actions taken based on the readings. Optimizing energy use can refer, for example, to achieving energy use efficiency values that indicate or result in a performance greater than a predefined threshold.

In some implementations, an optimization platform and system can use a steam and condensate model used with GAMS software. The GAMS software can include high-level modeling software providing a mathematical optimization model and a GAMS optimizer. However, improved system performance can be attained if a GAMS optimizer engine is executed using only utility programs required for the platform, for example, without including code for third-party development environment tools. In some implementations, a subset (for example, 1700 lines) of GAMS code can be used with a specialized model developed specifically for the platform. The platform can be fully integrated, for example, with OSI (formerly Oil Systems, Inc.) plant information (PI) systems to read and write PI data. As such, a user can access the optimization platform and system through a data visualization tool such as OSI PI ProcessBook to view current and optimum steam and condensate balance information.

In some implementations, a computer-implemented method is used for optimizing real-time energy use, including balancing steam and condensate. Real-time equipment readings are received from plural pieces of equipment at a facility. A steam and condensate balancing model is executed using the real-time equipment readings. The steam and condensate balancing model uses specialized optimizer engine code to balance steam output and condensate output. A set-point optimization model is executed with selection optimization turned off to identify optimum values for boilers, STGs, letdowns, and deaerators. The set-point optimization model is executed with selection optimization turned on to identify optimized settings for drivers of turbines and motors. Setting updates are provided to the plural pieces of equipment based on the executing.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, users can use the platform and system to implement optimum energy use in a plant. Second, automatically running set-point optimization and selection optimization can relieve the user of implementation sequence details. Third, an energy real-time optimizer (ERTO) platform can reduce overall project costs and costs associated with development, testing, convergence, cycle time, and PI integration.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIGS. 2B-1, 2B-2, 2C-1, 2C-2, 2D-1, 2D-2, 2E-1, and 2E-2 are schematic diagrams of the example of the system providing steam and condensate balance with example values associated with optimization steps, according to some implementations of the present disclosure.

FIGS. 3A-3C collectively show components of an example of a user interface (UI) for a general algebraic modeling system (GAMS) optimizer.

FIG. 7B shows a table listing examples of steam and power consumption values and equipment running counts for steam turbine and electric motor sets, according to some implementations of the present disclosure.

FIGS. 8A and 8B are screen shots listing an example of code used for a developed optimizer system, according to some implementations of the present disclosure.

Like reference numbers and designations in the various drawings indicate like elements.

DETAILED DESCRIPTION

The following detailed description describes techniques for optimizing real-time energy use, including balancing steam and condensate, using a general algebraic modeling system (GAMS) optimizer. For example, an energy real-time optimizer (ERTO) can be used to monitor an entire energy network and provide real-time optimization solutions in order to reduce operating costs and to increase economic benefits. The term real-time can correspond, for example, to events that occur within a specified period of time, such as within one day, within one hour, or within minutes. The events can include, for example, equipment readings and subsequent actions taken based on the readings. Optimizing energy use can refer, for example, to achieving energy use efficiency values that indicate or result in a performance greater than a predefined threshold.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Figure 1A:
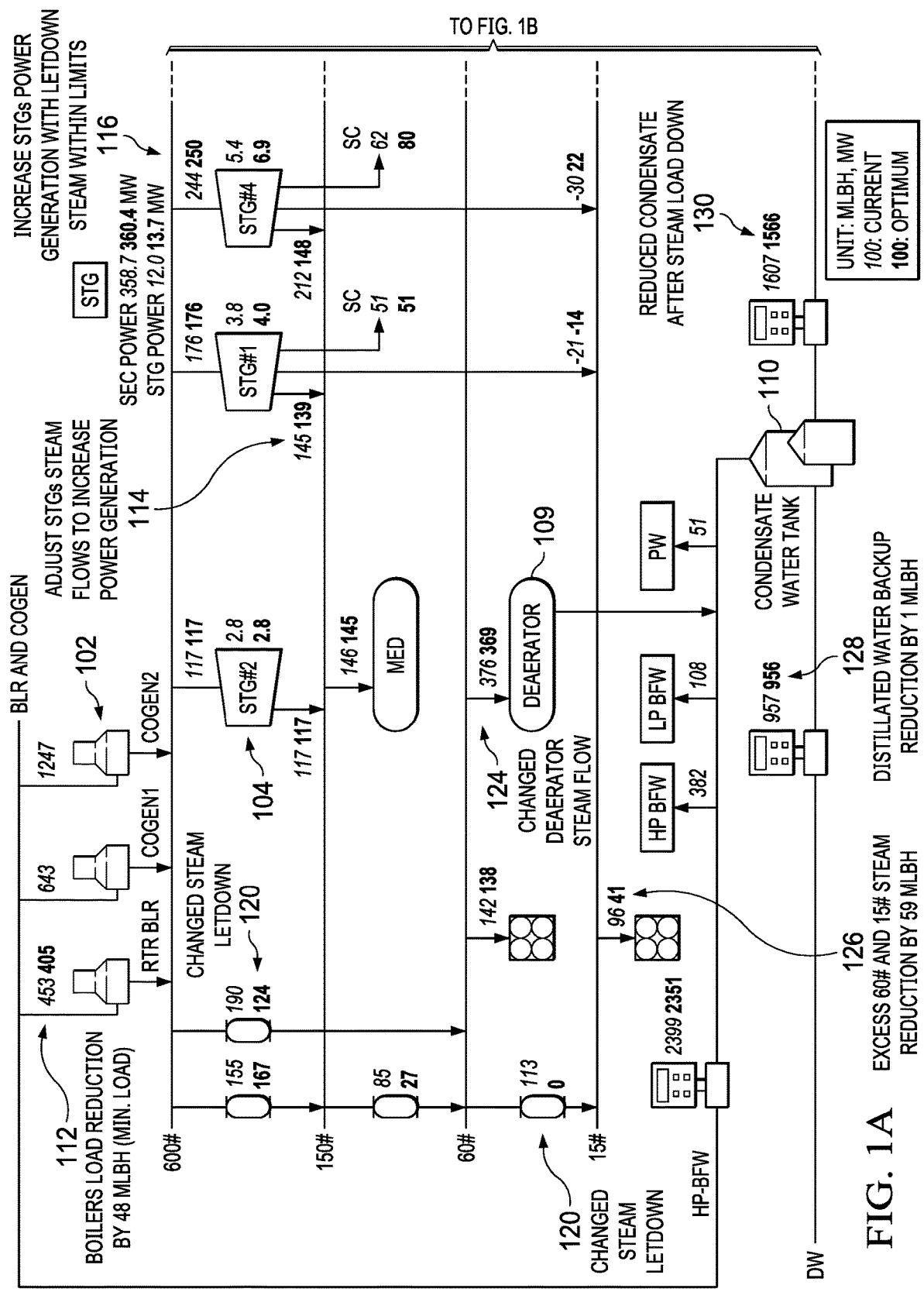
FIGS. 1A-1B are diagrams collectively showing an example of an energy balance optimizer system, according to some implementations of the present disclosure.
Figure 1B:
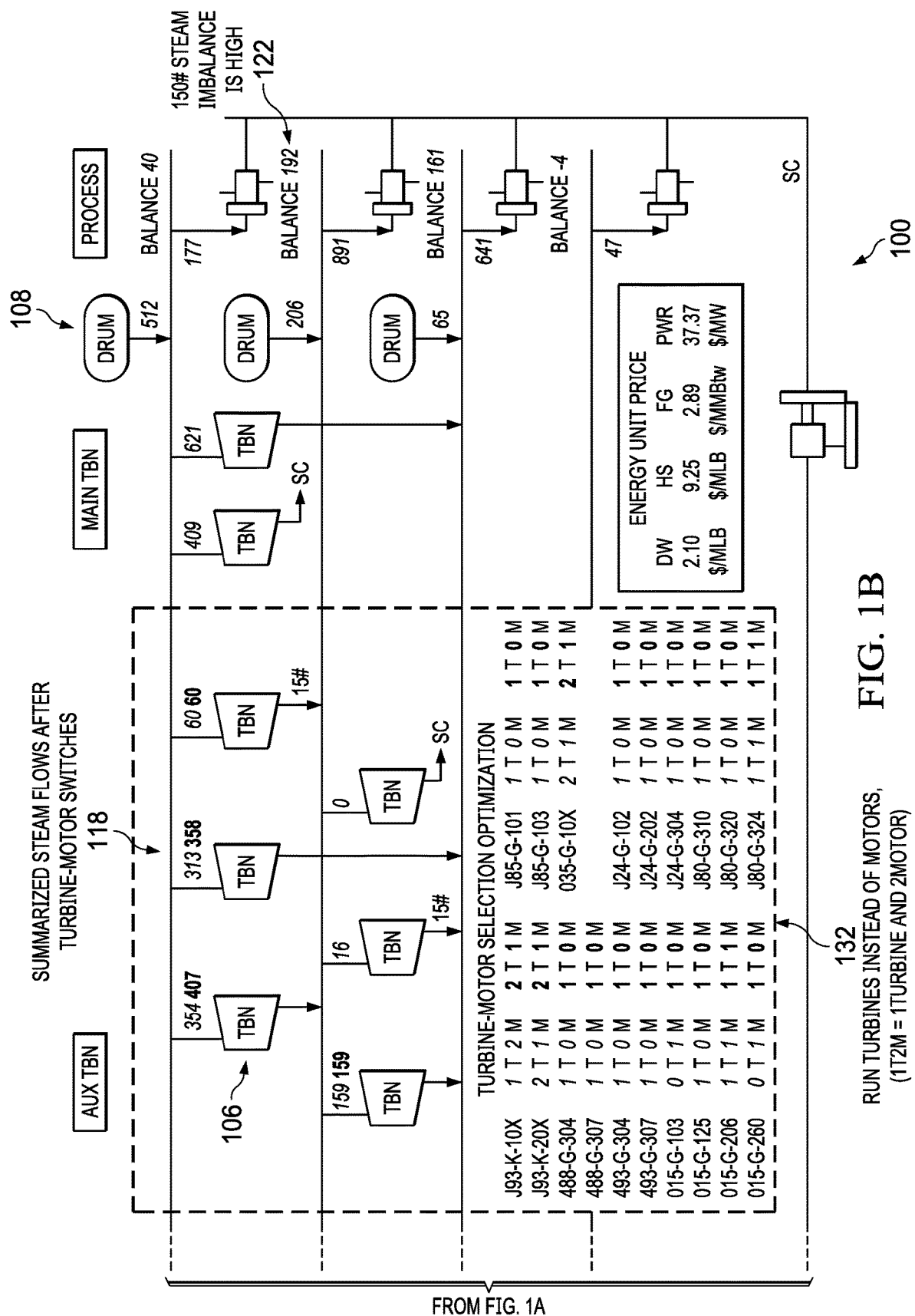

FIGS. 1A-1B are diagrams collectively showing an example of an energy balance optimizer system 100, according to some implementations of the present disclosure. The energy balance optimizer system 100 includes boilers 102, steam turbine generators (STGs) 104, turbines (TBNs) 106, steam drums 108, a deaerator 109, and condensate water tanks 110. The real-time energy optimizer of the energy balance optimizer system 100 can produce the following setting updates or determinations: 1) a load reduction 112 in the boilers, for example, by 48 thousand pounds per hour (MLBH) (minimum load); 2) STG steam flows 114 are adjusted to increase power generation; 3) STG power generation 116 is increased with letdown steam within limits; 4) steam flows 118 are summarized after turbine-motor switches; 5) steam letdown 120 is changed; 6) a 150-pound (#) steam imbalance 122 between supply and consumption and will be the same between the current and optimum case, for example, that the 150-pound (#) steam imbalance is high; 7) deaerator steam flow 124 is changed; 8) excess 60# and 15# steam 126 is reduced, for example, by 59 MBLH; 9) distilled water backup 128 is reduced, for example, by 1 MLBH; 10) condensate 130 is reduced after steam load-down; and 11) turbines 132 are run instead of motors, for example, with a 1T2M=one turbine to 2 motor ratio.

Figures 1, 2A:
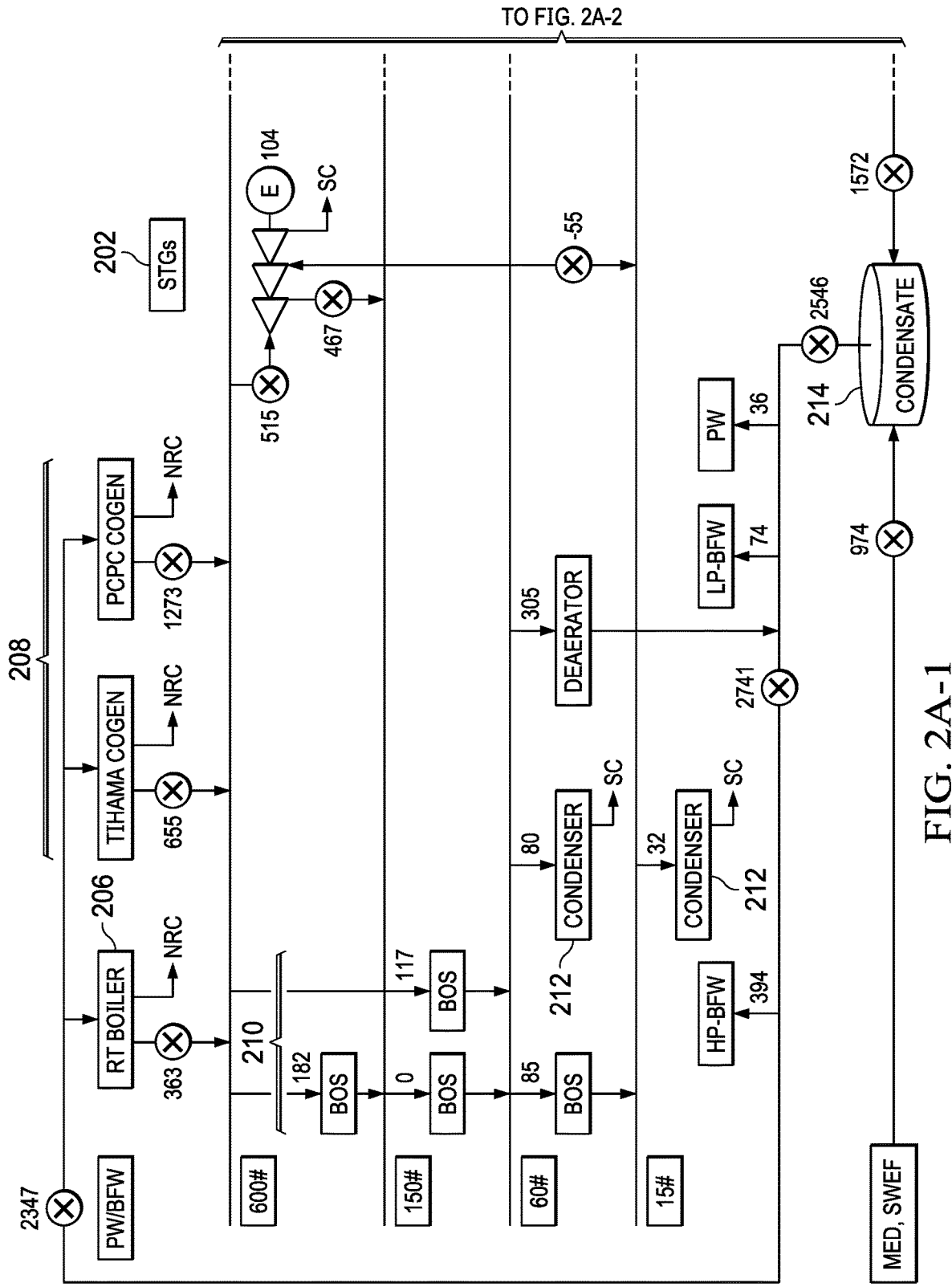
FIGS. 2A-1 through 2A-2 are diagrams collectively showing an example of a system providing steam and condensate balance, according to some implementations of the present disclosure.
Figures 2, 2A:
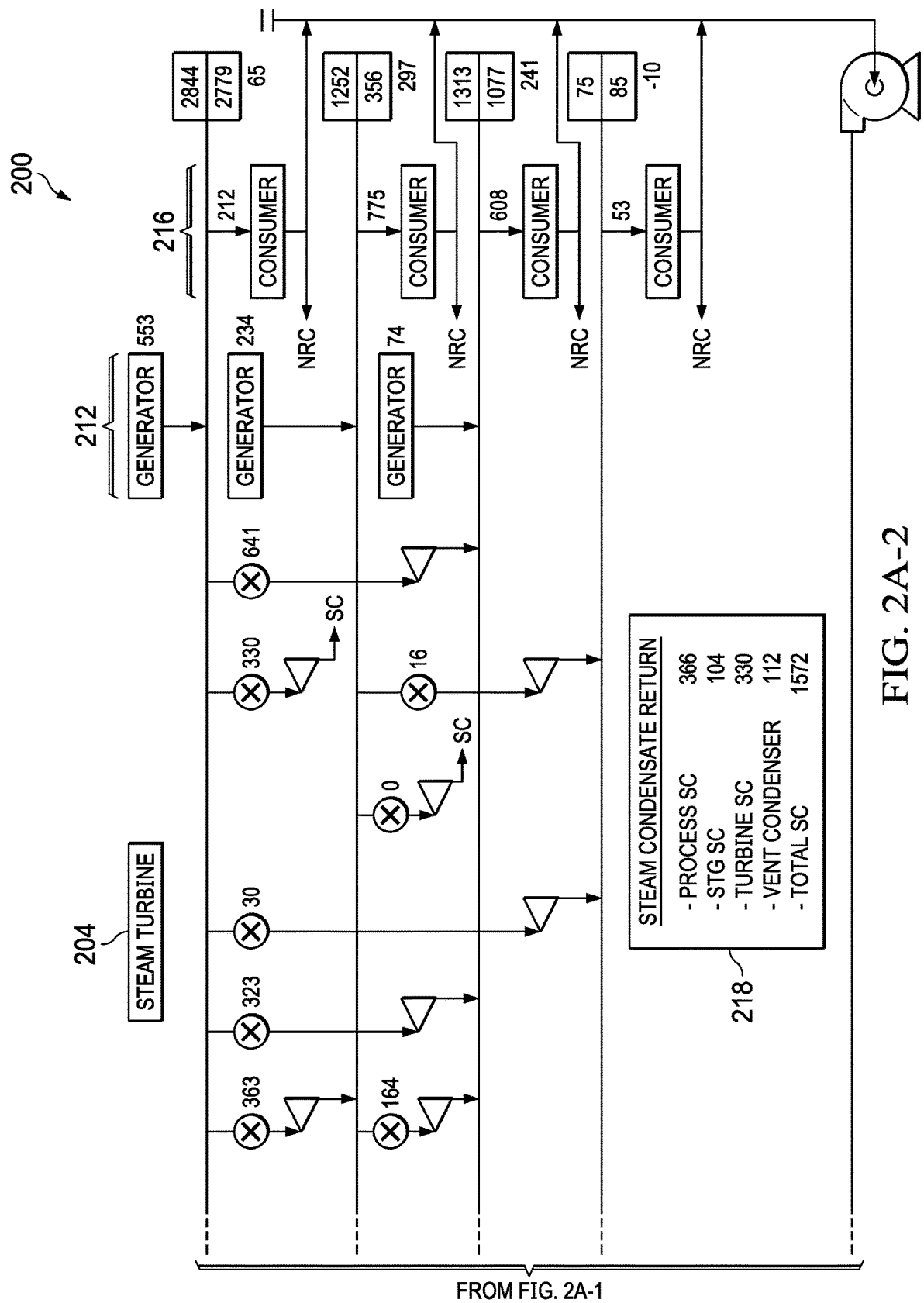

FIGS. 2A-1 through 2A-2 are diagrams collectively showing an example of a system 200 providing steam and condensate balance, according to some implementations of the present disclosure. The schematic shows flows between various components of the system 200. The components include, for example, STGs 202, a steam turbine 204, a boiler 206, cogeneration units 208, steam letdowns 210 (or a letdown station), vent steam condensers 212, condensate tanks 214, and heat exchanger and other consumers 216. A steam condensate return table 218 identifies specific amounts of steam condensate returned by specific components. FIG. 7B shows a table 750 listing steam and power consumption values and the equipment running counts for steam turbine and electric motor sets.

FIGS. 2B-1, 2B-2, 2C-1, 2C-2, 2D-1, 2D-2, 2E-1, and 2E-2 are schematic diagrams of the example of the system 200 providing steam and condensate balance with example values associated with optimization steps, according to some implementations of the present disclosure. For example, FIGS. 2B-1, 2B-2, 2C-1, 2C-2, 2D-1, 2D-2, 2E-1, and 2E-2 illustrate four optimization steps: 1) current operation; 2) setpoint optimization only; 3) both setpoint and selection optimization; and 4) mixed result (setpoint from step 2 and selection from step 3).

Figures 1, 2B:
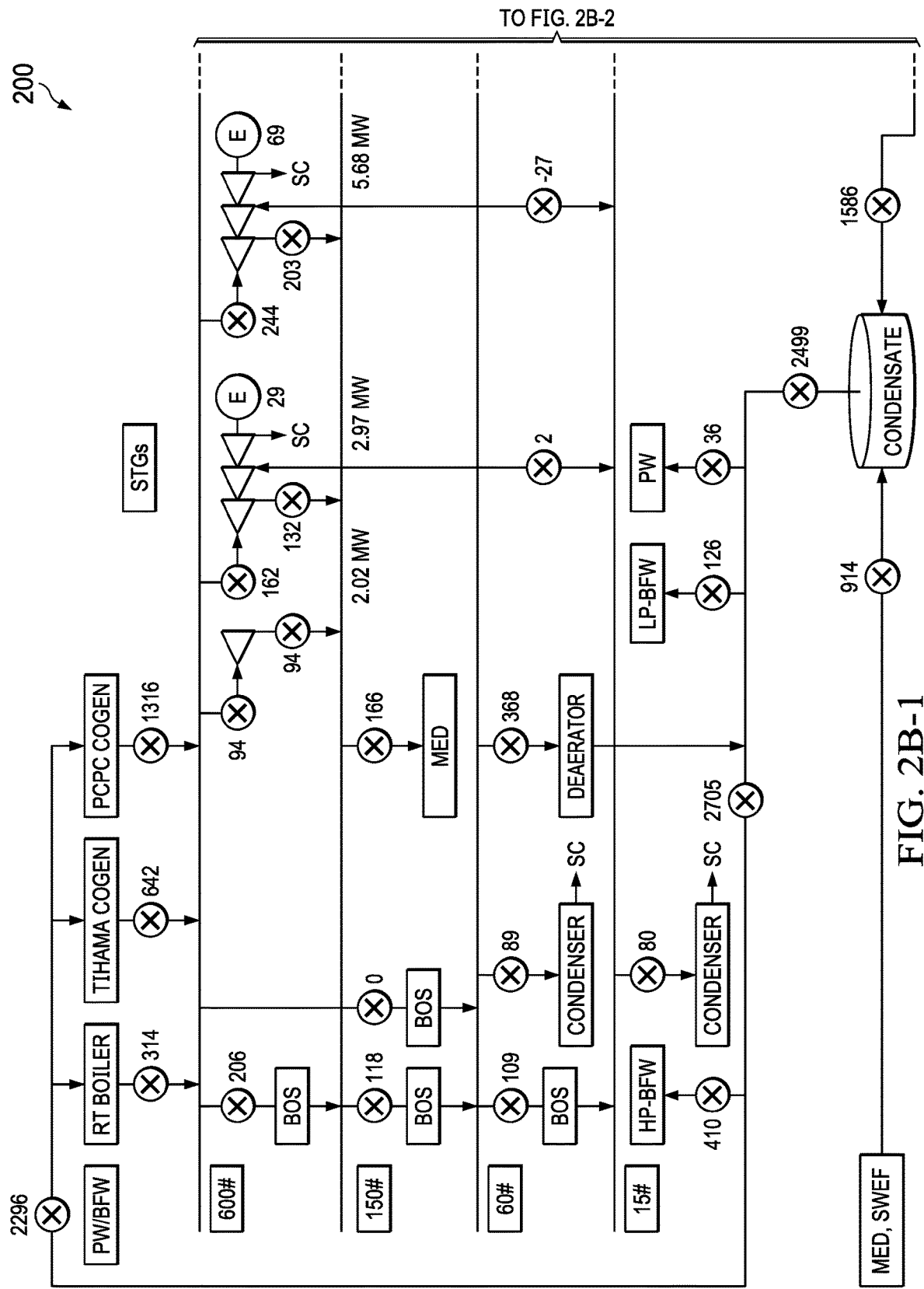
Figures 2, 2B:
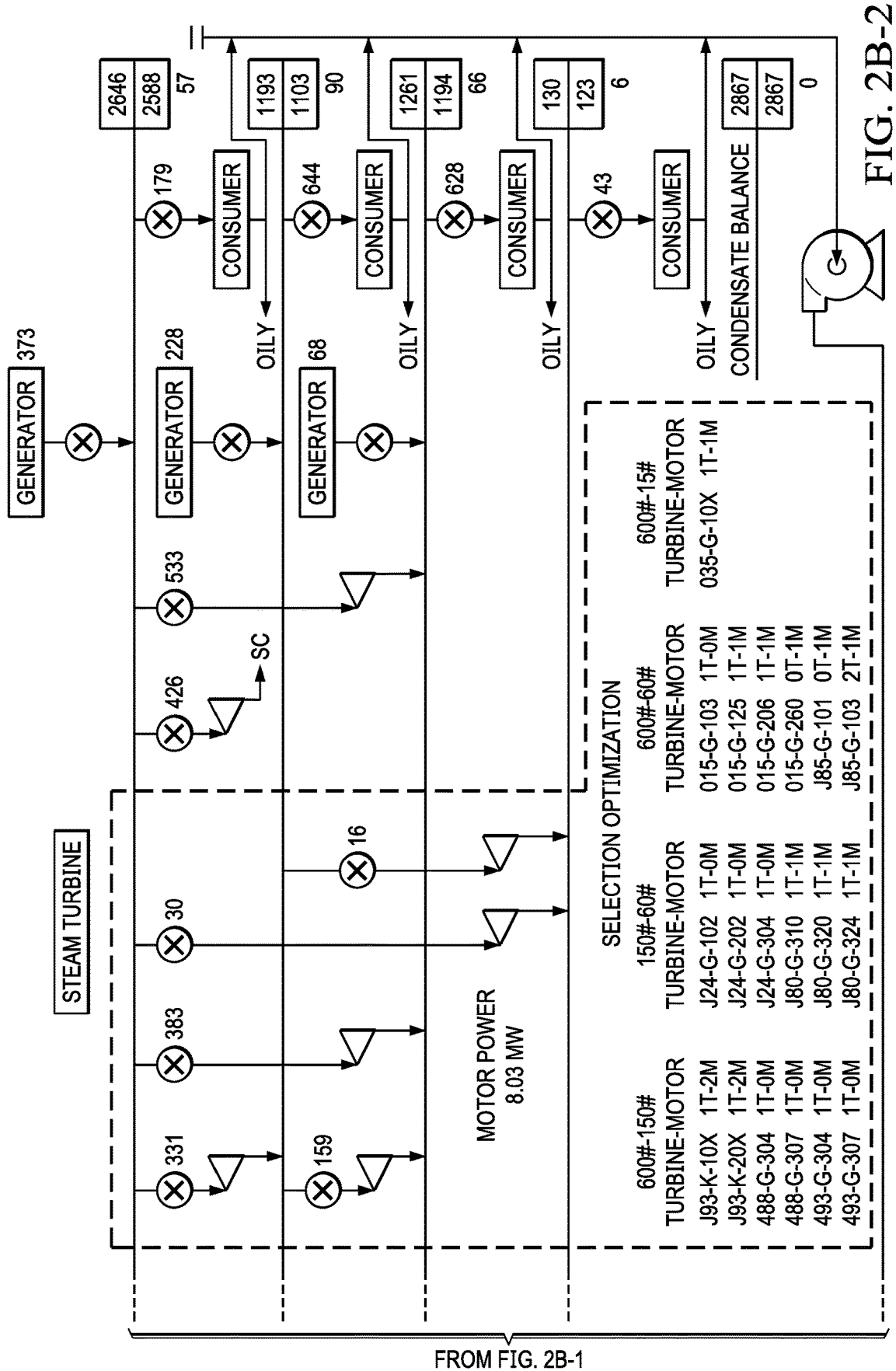
Figures 1, 2C:
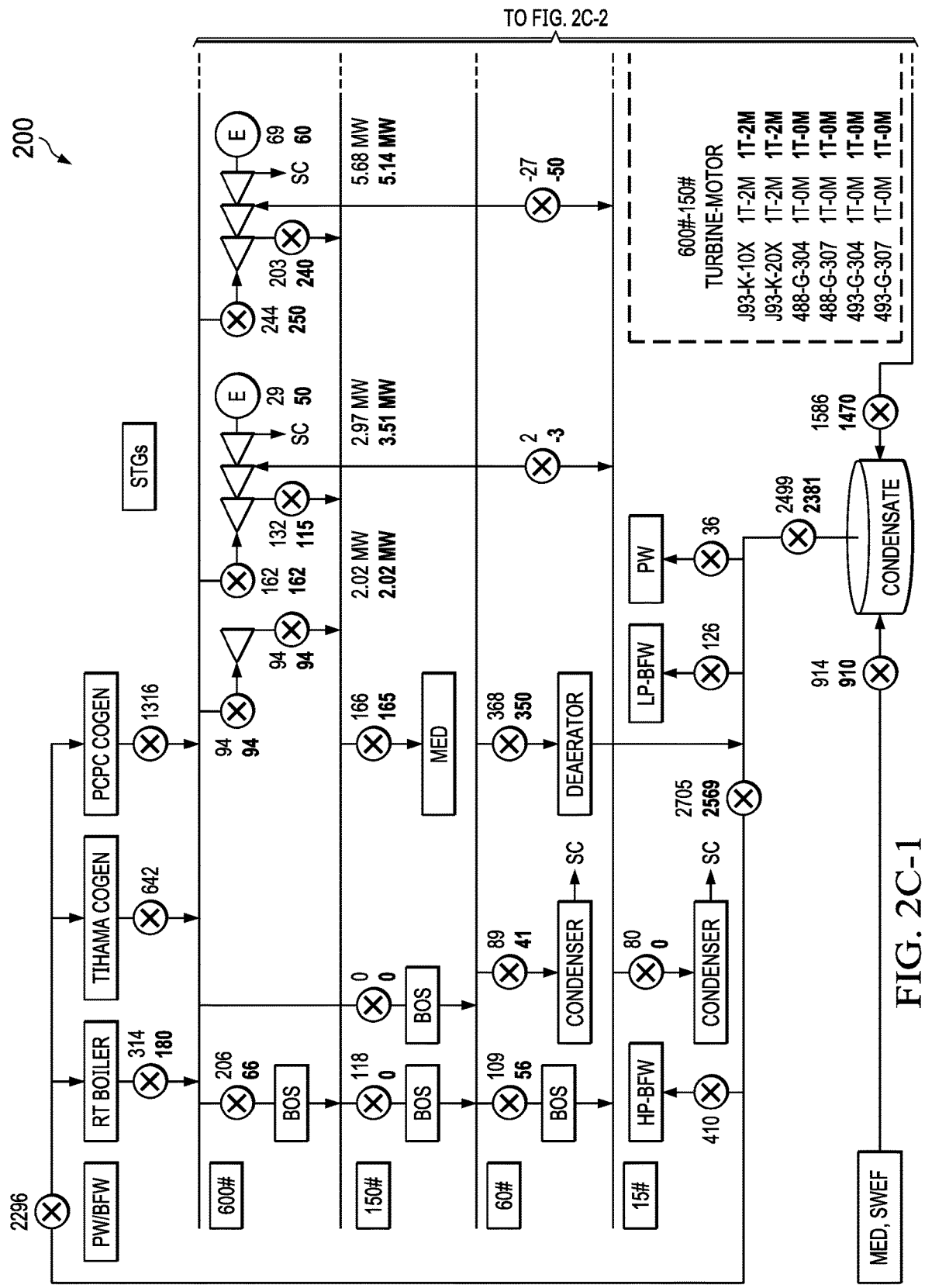
Figures 2, 2C:
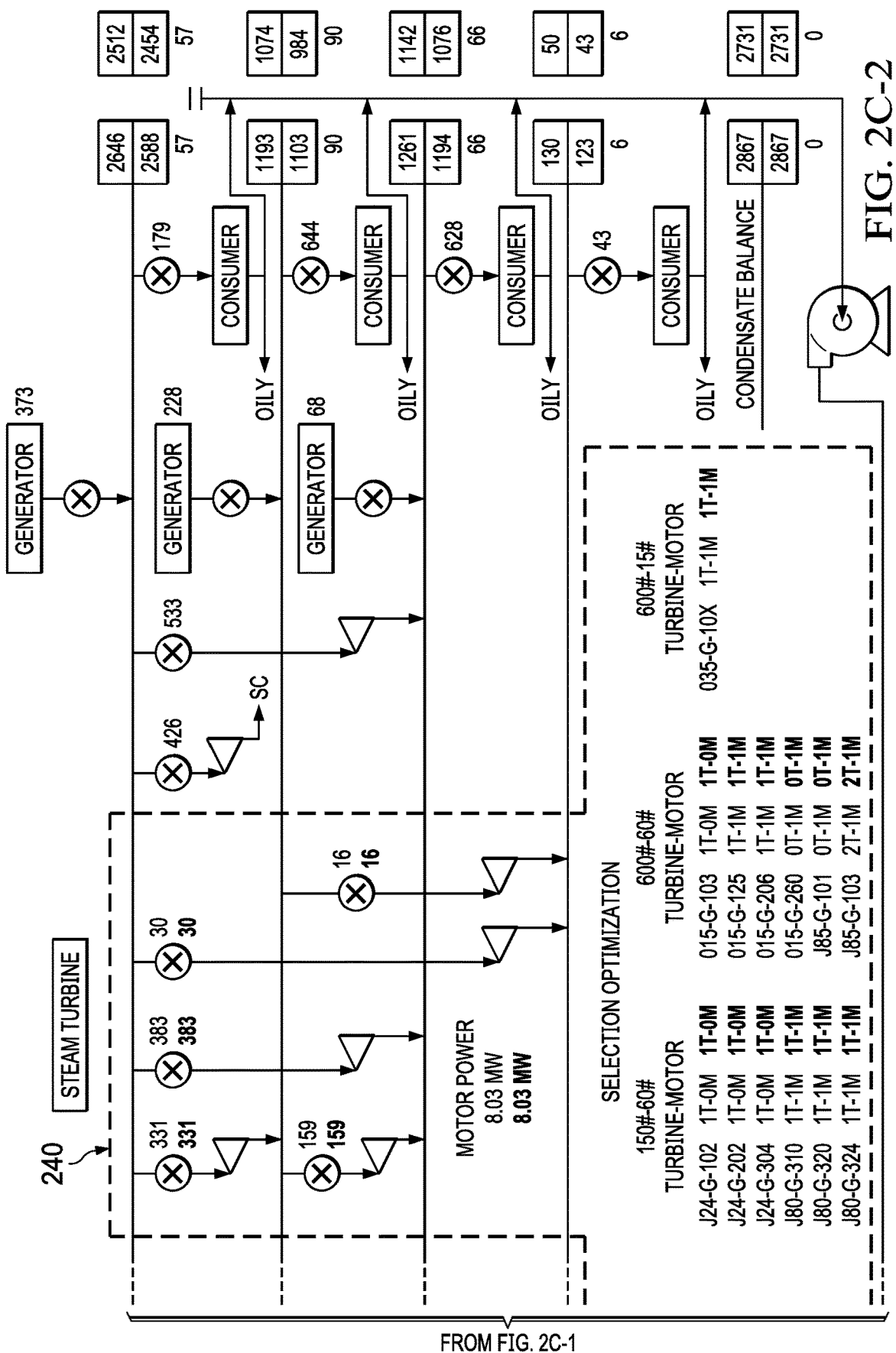

FIGS. 2B-1 and 2B-2, corresponding to step 1, show an example of a current operation case without any optimization. FIGS. 2C-1 and 2C-2 correspond to step 2 and show an optimization case with setpoint optimization set to ON and selection optimization set to OFF. A dashed area 240 defined as selection optimization will not change. In this step, the following apply. 89 and 80 MLBH of 60# and 15# steam supplied to vent condenser are decreased to 41 and 0 MLBH (Net=128 MLBH). 29 and 69 MLBH of STG condensing steam are increased to 50 and 60 MLBH (Net=−12 MLBH). 166 MLBH of MED steam is decreased to 165 MLBH (Net=1 MLBH). 368 MLBH of deaerator steam is decreased to 350 MLBH (Net=18 MLBH). Boiler steam generation is decreased from 314 to 180 MLBH (Net 134 MLBH). Boiler steam 134 MLBH=Vent condenser 128 MLBH+STG condensing steam −12 MLBH+MED steam 1 MLBH+Deaerator 18 MLBH.

Figures 1, 2D:
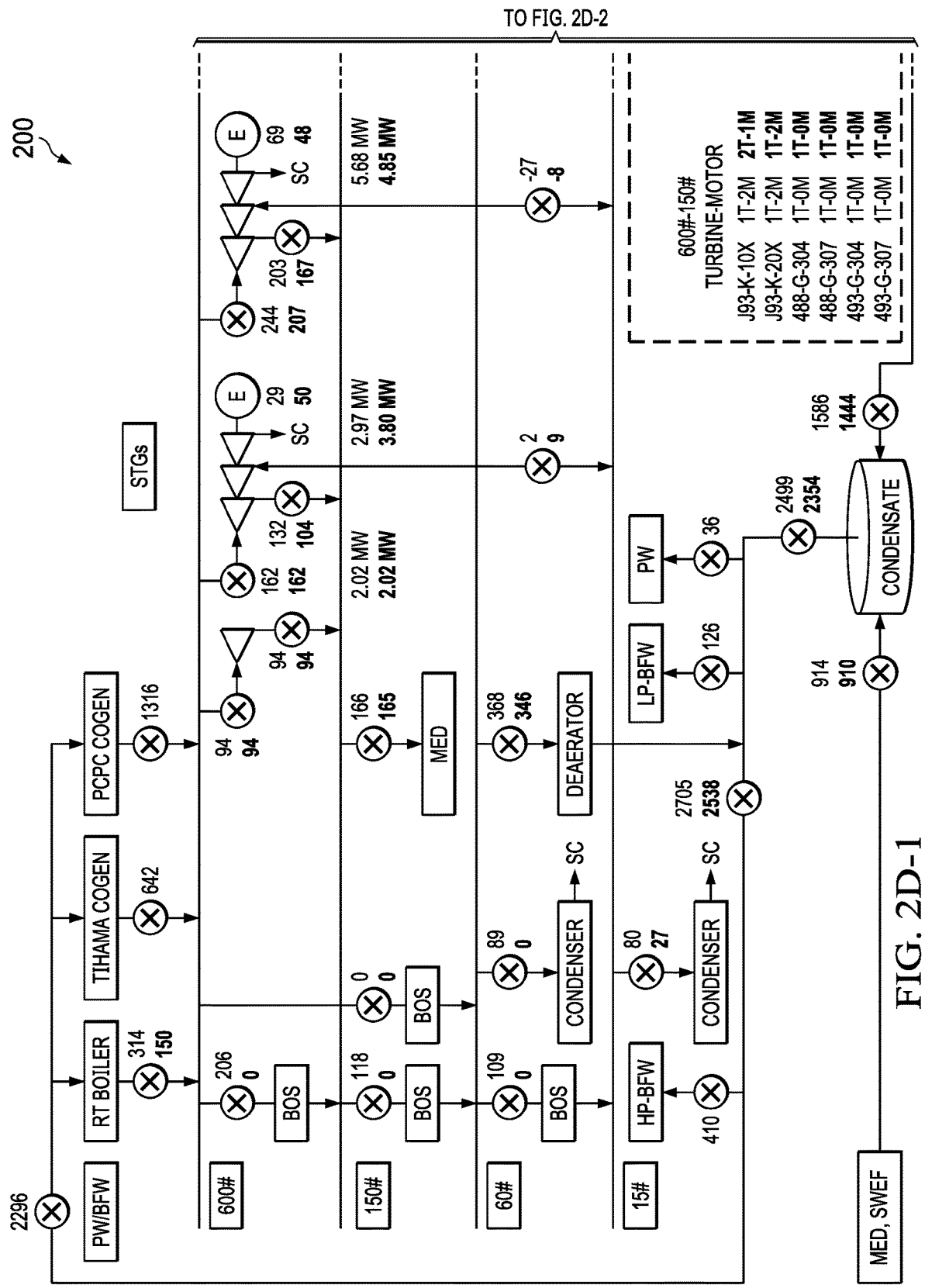
Figures 2, 2D:
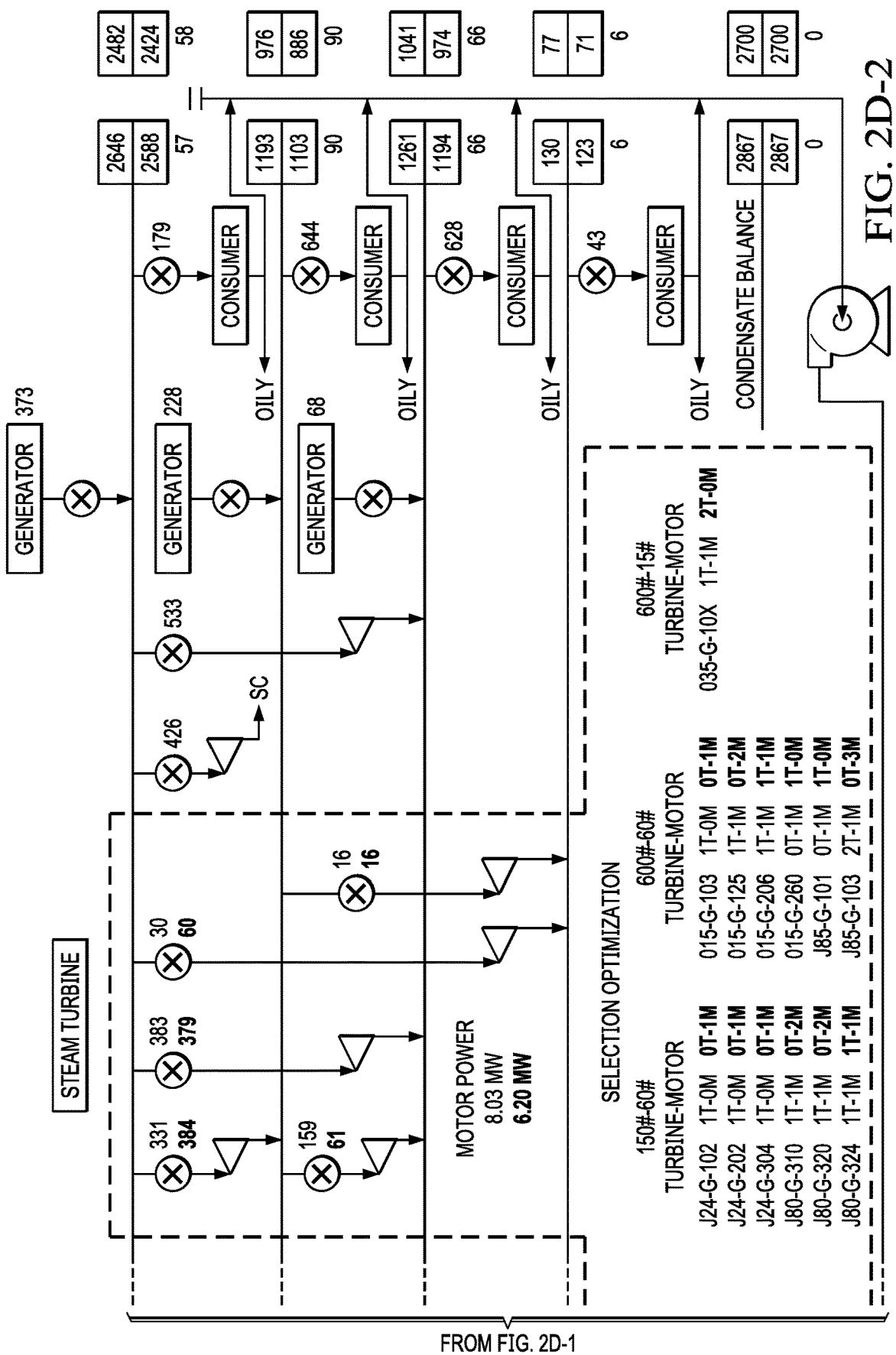

FIGS. 2D-1 and 2D-2 correspond to step 3 and show an example of an optimization case in which setpoint optimization is set to ON and selection optimization is set to OFF. In this step, the following apply. 89 and 80 MLBH of 60# and 15# steam supplied to vent condenser are decreased to 0 and 27 MLBH (Net=142 MLBH). 29 and 69 MLBH of STG condensing steam are increased to 50 and 48 MLBH (Net=0 MLBH). 166 MLBH of MED steam is decreased to 165 MLBH (Net=1 MLBH). 368 MLBH of Deaerator steam is decreased to 346 MLBH (Net=22 MLBH). Boiler steam generation is decreased from 314 to 150 MLBH (Net 164 MLBH, 150 MLBH is boiler minimum load). Boiler steam 164 MLBH=vent condenser 142 MLBH+STG condensing steam 0 MLBH+MED steam 1 MLBH+Deaerator 22 MLBH. The steam turbine and electric motor are switched, excess letdown steam are supplied to steam turbine, then motors are stopped, so electric motor energy changes from 8.03 to 6.20 by 1.83 megaWatts per hour ((MW)/hr).

Figures 1, 2E:
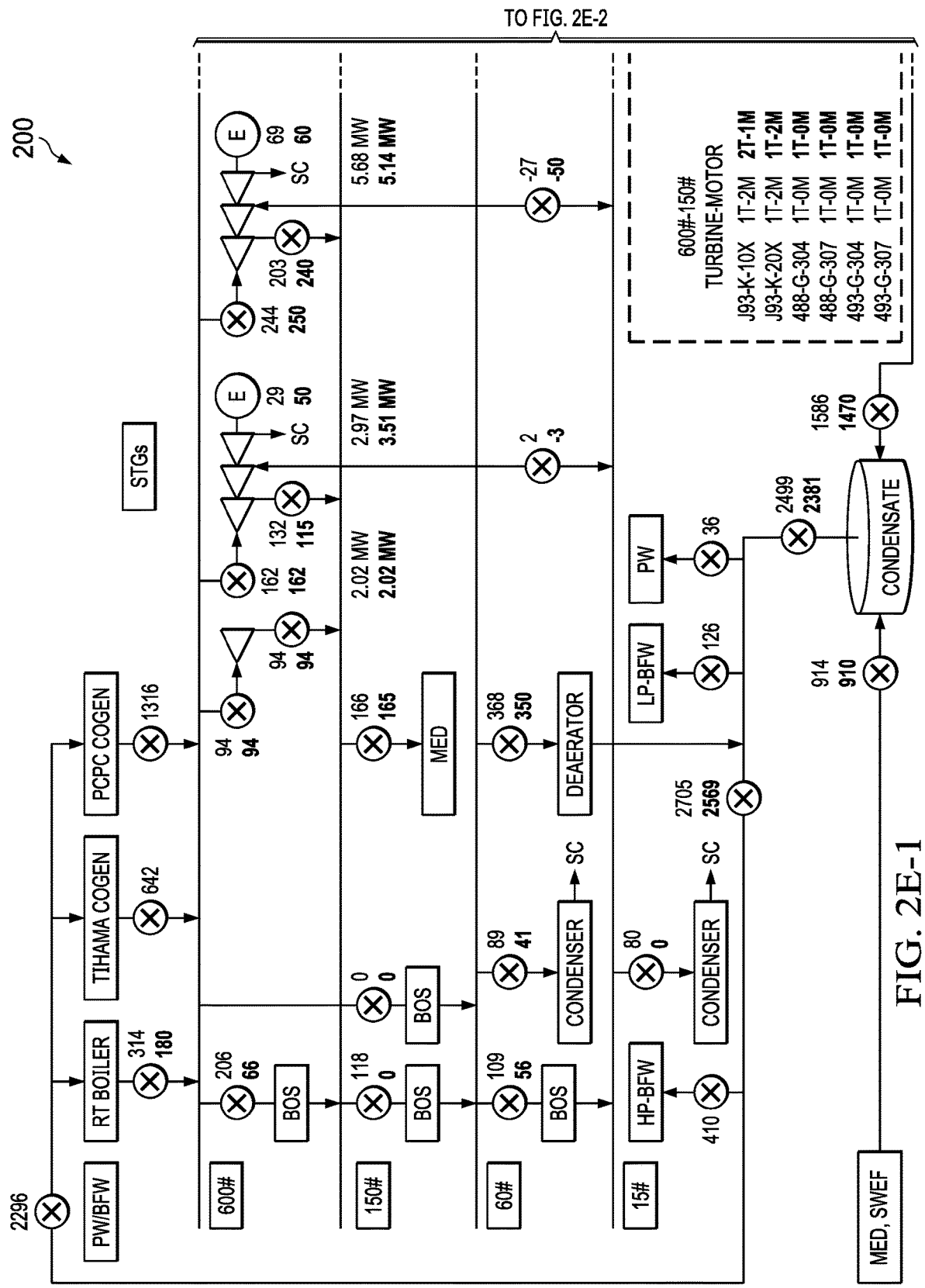
Figures 2, 2E:
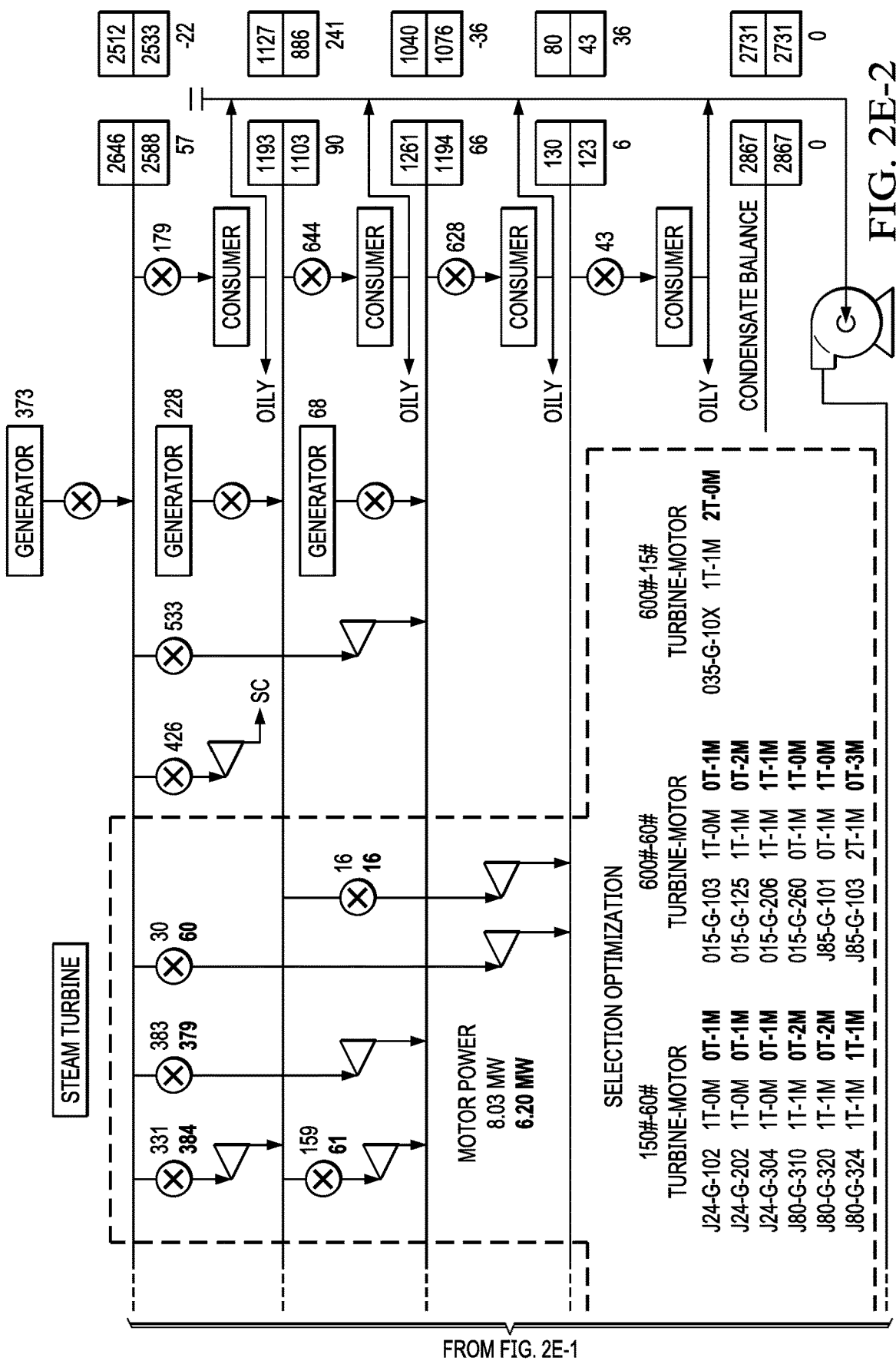

FIGS. 2E-1 and 2E-2 correspond to step 4 and show an example of a mixed optimization result. In this example, setpoint optimization part is coming from step 2, and Selection optimization part is coming from step 3.

Figure 3A:
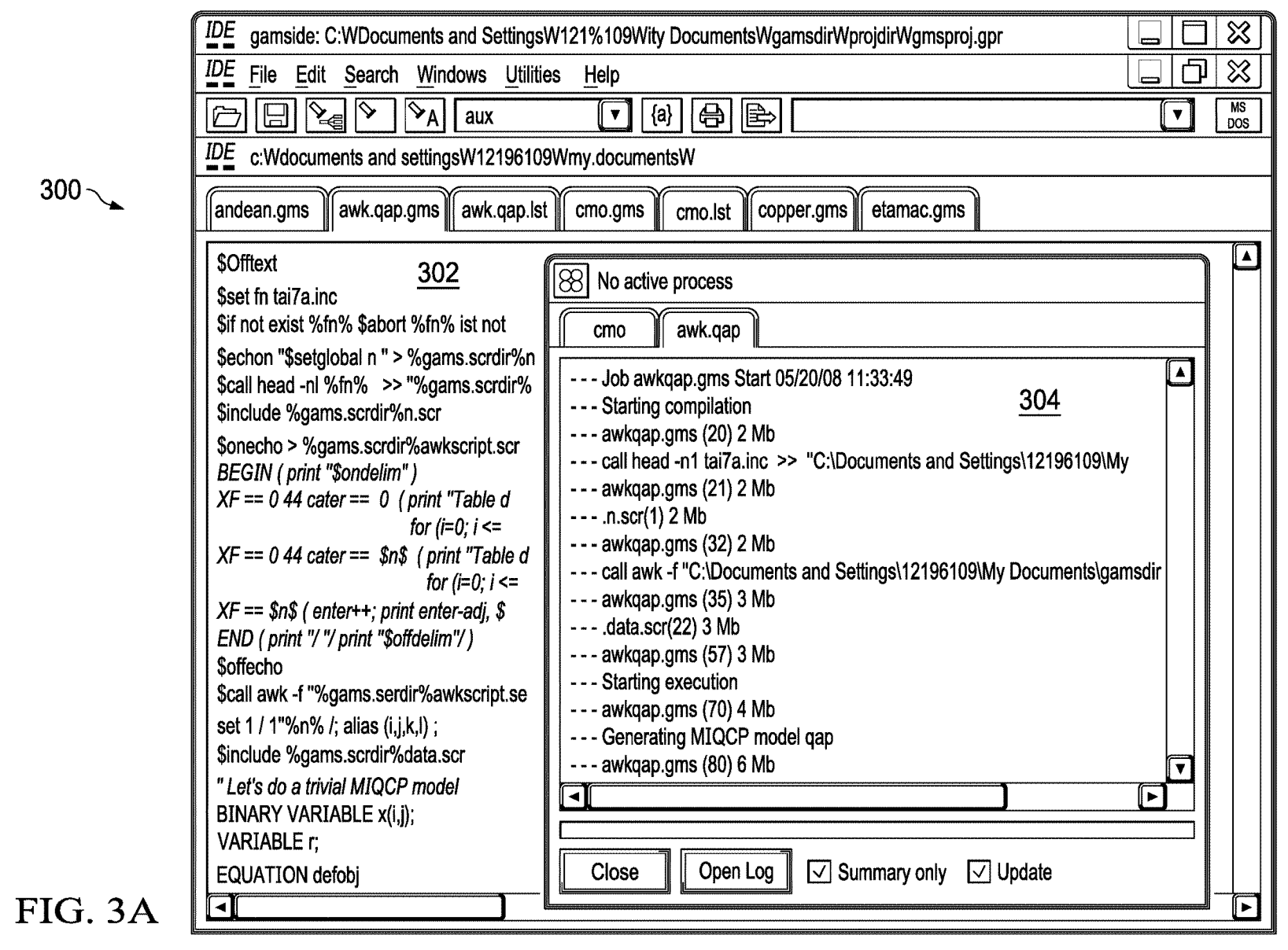
Figure 3B:
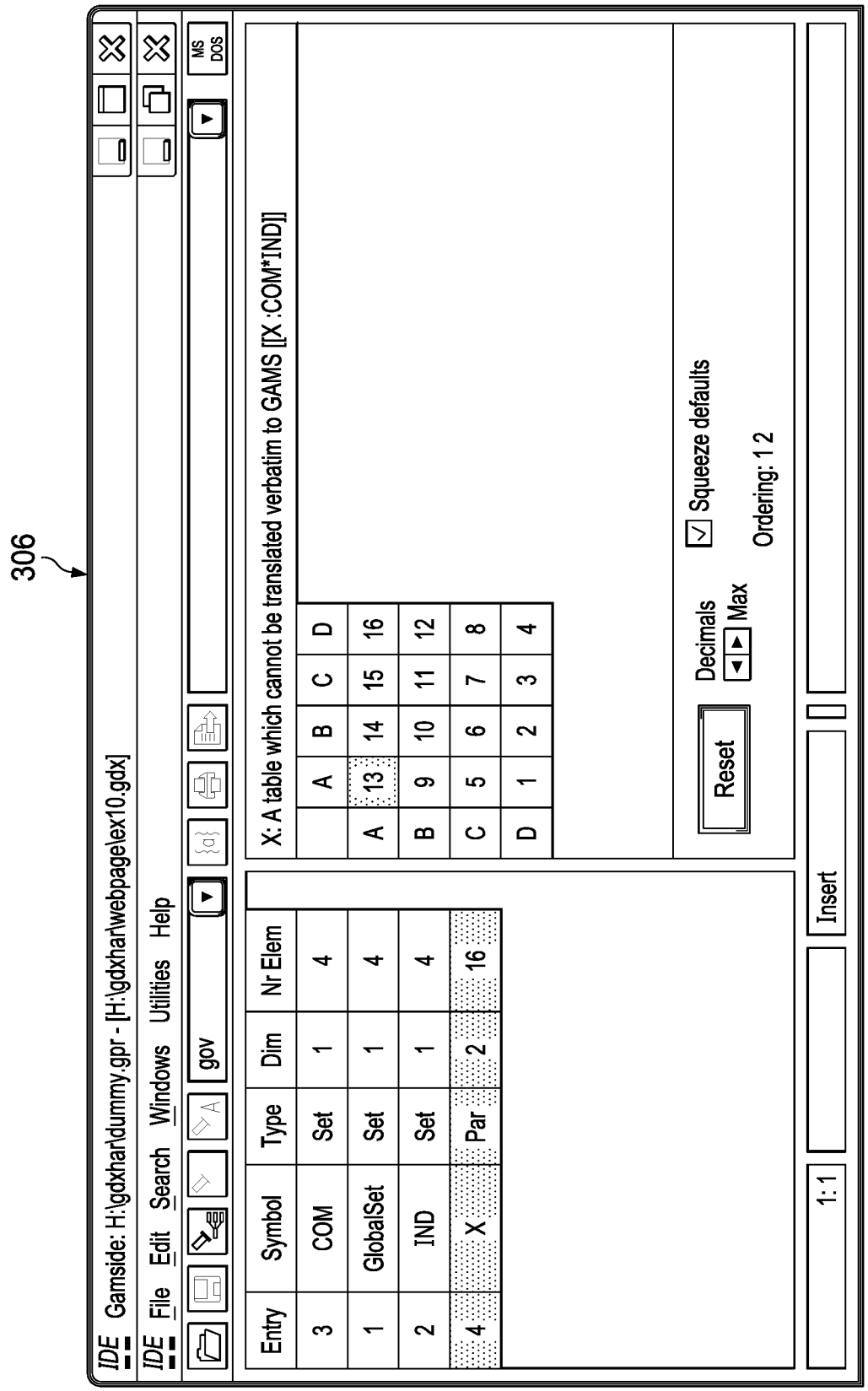
Figure 3C:
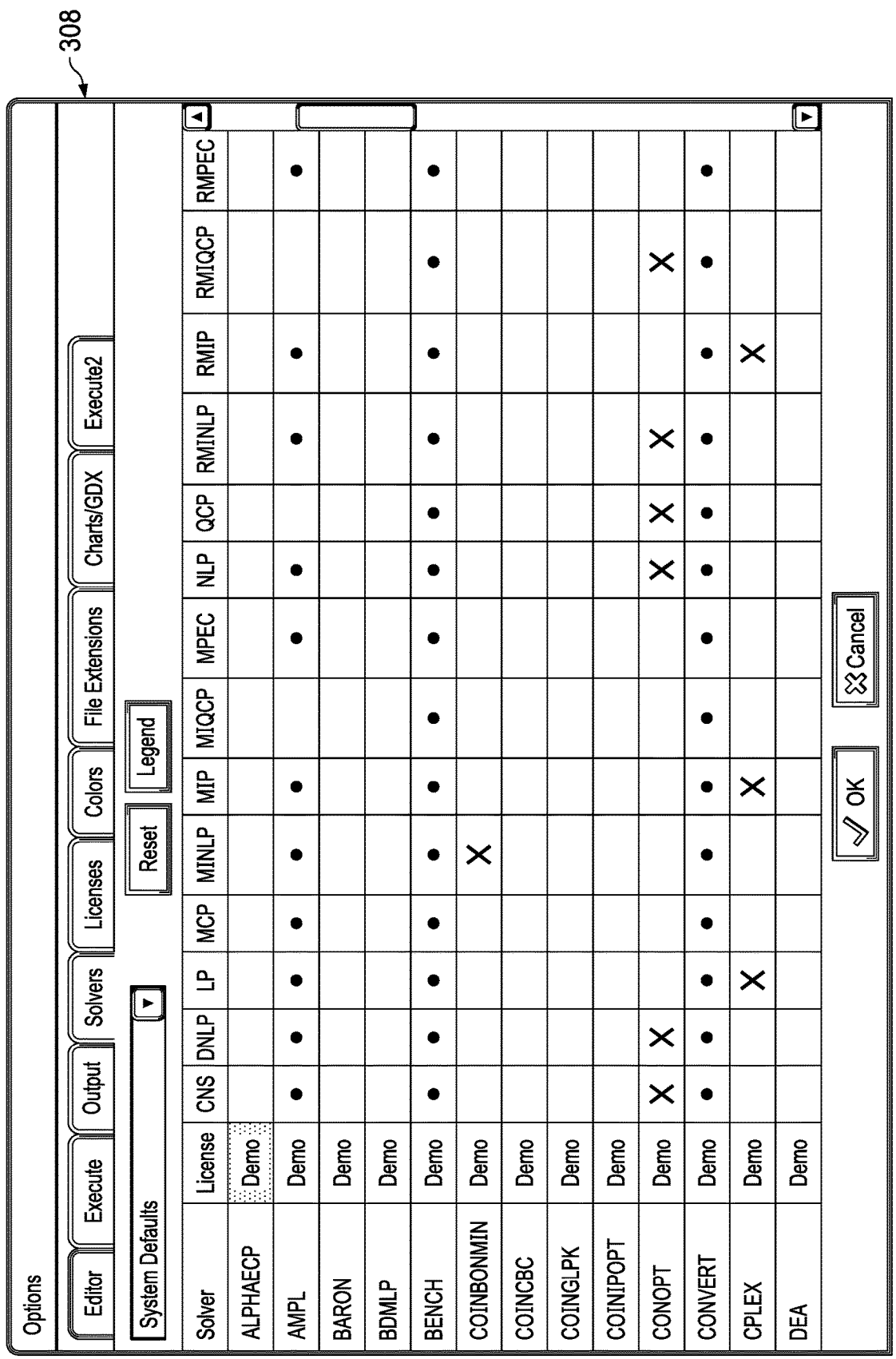

FIGS. 3A-3C collectively show components of an example of a user interface (UI) 300 for a general algebraic modeling system (GAMS) optimizer. The UI 300 includes a GAMS algorithm choice window 308, a GMS coding area 302, an output log 304, a GDX tool capture 306, and a GAMS Data eXchange (GDX) capture tool 308 (for example, used together for data exchanges with other databases).

The GAMS optimizer can solve linear, nonlinear, and mixed-integer optimization problems using different kinds of solvers, such as BARON, COIN-OR, CONOPT, CPLEX, DICOPT, Gurobi, MOSEK, SNOPT, SULUM, and XPRESS. However, the demo version of the GAMS optimizer, used in the present disclosure, can also impose model size limitations. The limitations result in limiting the size of the steam and condensate balance model, for example. The limitations of the GAMS optimizer can include, for example, 50 discrete variables, 300 variables, and 2000 elements.

Optimizers can use many types of mathematical optimizations, including setpoint and selection, control optimization, inventory optimization, blending optimization, portfolio optimization, planning optimization, scheduling optimization, and trading optimization. Optimizations can be categorized by problem type, for example. Optimization categories can include, for example, steam and condensate balance optimization, and hydrogen and off-gas balance optimization. The optimization category that includes steam and condensate balance optimization is characterized by the following Table 1.

TABLE 1

| Steam and Condensate Balance Optimization | | |
|---|---|---|
| | Setpoint | Selection |
| Applied to | Boilers, steam letdown, steam turbine generator | Turbine-motor swapping |
| Output | Real number (for example, boiler load 450.5 to 430.7) | Integer (for example, 1 turbine-0 motor to 0 turbine-1 motor) |
| Algorithm | Linear programming (LP) or non-linear programming (NLP) | Mixed integer linear programming (MILP) or mixed integer non-linear programming (MINLP) |
| Action by | Distributed Control System (DCS) activity by console operator | Field activity by field operator |

Table 2 describes example software for the GAMS optimizer platform.

TABLE 2

| GAMS Optimizer Platform | |
|---|---|
| Software | Description |
| Optimizer | GAMS is a high-level modeling system for mathematical optimization and is designed for modeling and solving linear, nonlinear, and mixed-integer optimization problems. |

TABLE 2-continued

| GAMS Optimizer Platform | |
|---|---|
| Software | Description |
| PIconfig | The PIconfig utility is a command-line administration tool for PI data archive. The PIconfig utility provides scriptable access to PI data archive configuration tasks and underlying data tables. The PIconfig utility can be automatically installed on all PI data archive computers and PI Networking System (PINS) nodes. |
| SED | SED (stream editor) is a Unix utility that parses and transforms text using a simple, compact programming language based on the scripting features of the interactive editor. SED is available for most operating systems. |
| AWK | AWK is a programming language designed for text processing and typically used as a data extraction and reporting tool. AWK is a standard feature of most Unix-like operating systems. |
| Windows Task Scheduler | The Windows Task Scheduler is a component of Microsoft Windows that provides the ability to schedule the launch of programs or scripts at pre-defined times or after specified time intervals. |

Figures 4, 6:
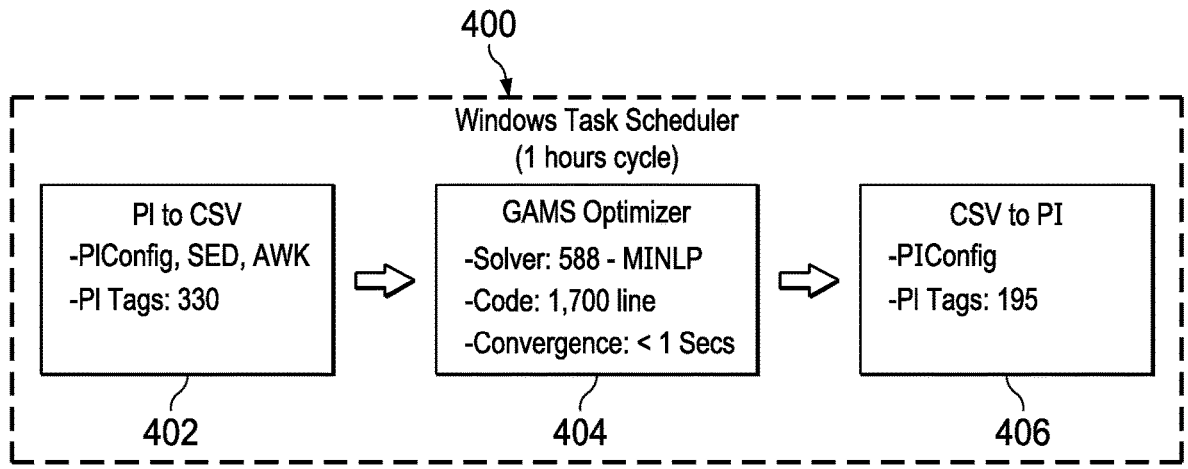
FIG. 4 is a diagram of an example of an energy balance optimizer scheduler, according to some implementations of the present disclosure.
FIG. 6 is a screenshot of an example of a notepad containing batch file code, according to some implementations of the present disclosure.

FIG. 4 is a diagram of an example of an energy balance optimizer scheduler 400, according to some implementations of the present disclosure. A cycle that can be scheduled by the energy balance optimizer scheduler 400 includes a PI-to-CSV (comma-separated values) step 402, a GAMS optimizer step 404, and a CSV-to-PI step 406. The steps can be implemented within a platform integrated with a PI system to read and write plant information and current and optimum values, running within a one-hour cycle time, for example.

Figure 5:
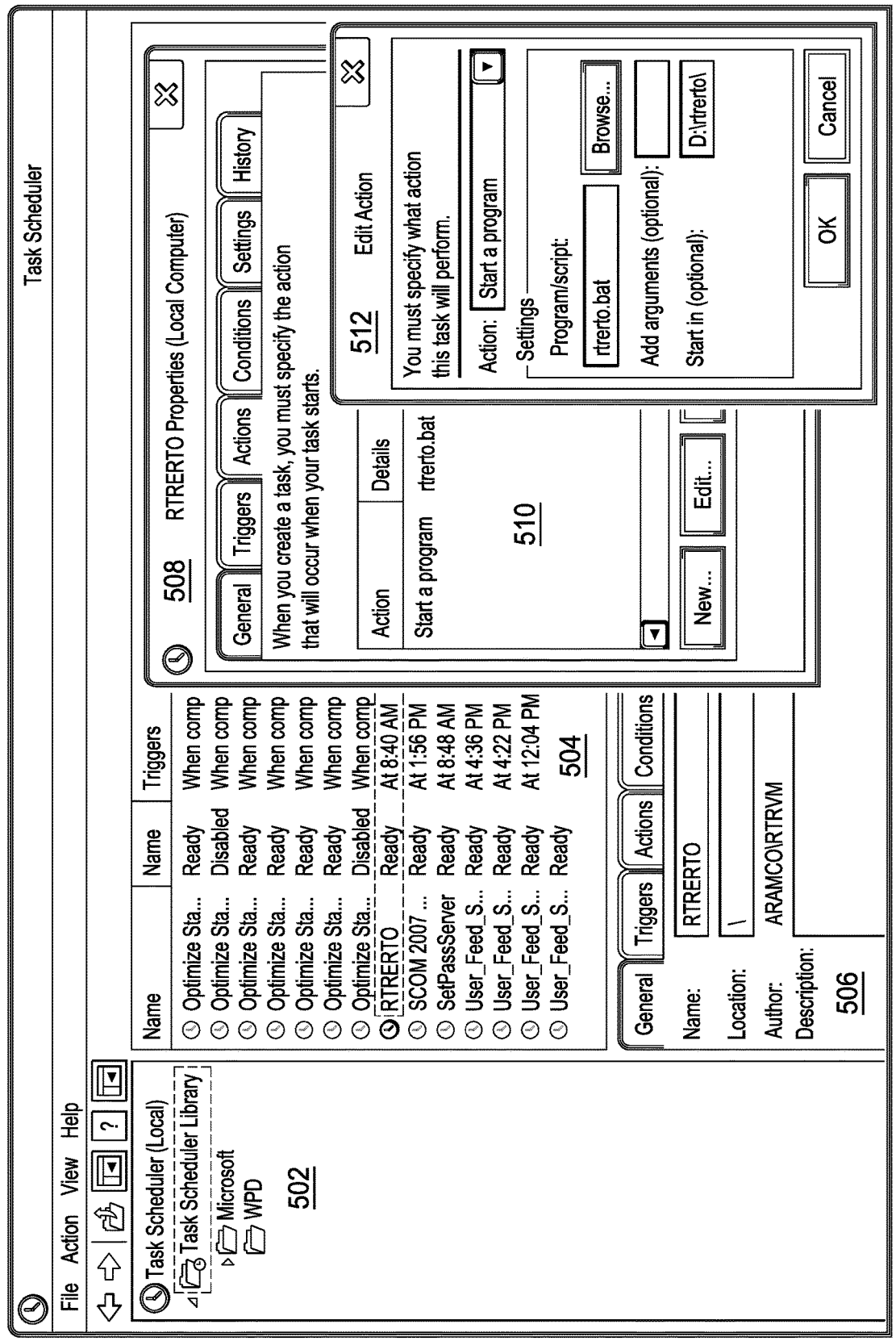
FIG. 5 is a screenshot of an example of a UI for optimizer task scheduling, according to some implementations of the present disclosure.

FIG. 5 is a screenshot of an example of a UI 500 for optimizer task scheduling, according to some implementations of the present disclosure. The user interface 500 includes a task scheduling area 502, a task list 504, and a task definition area 506 for defining a selected task (for example, a Windows batch file (rtrerto.bat) that can be registered with a one-hour running cycle). A task properties window 508 lists task actions 510 for a selected task. A task edit window 512 allows user definition of properties and parameters for a user-selected task action.

FIG. 6 is a screenshot of an example of a notepad 600 containing batch file code 602, according to some implementations of the present disclosure. The batch file code 602 corresponds, for example, to a Windows batch file (for example, rtrerto.bat) that is currently selected in the task definition area 506. The batch file code 602 contains code for reading PI tag values, running the GAMS model, and writing current and optimum values at PI tags.

During execution of the batch file code 602, PI tag data is scanned by a PIconfig script. The data is converted into a GAMS-compatible file format. Then the data is merged with the GAMS optimizer using SED and AWK scripts provided as utilities with the GAMS optimizer package.

Figure 7A:
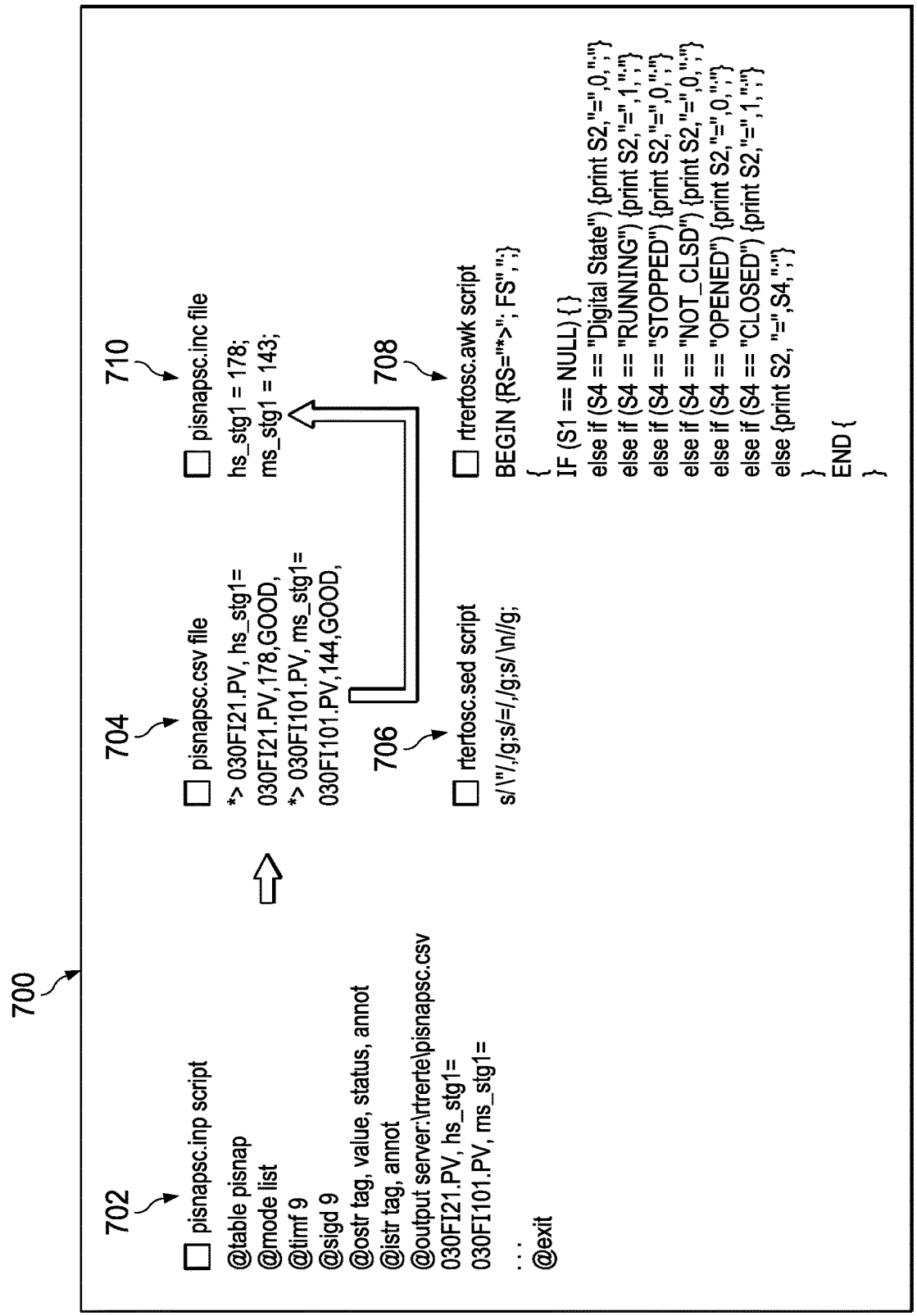
FIG. 7A is a diagram of an example of a flow using a script code, according to some implementations of the present disclosure.

FIG. 7A is a diagram of an example of a flow 700 using a script code, according to some implementations of the present disclosure. As shown in FIG. 7A, the script code is PIConfig, SED, and AWK script code. The flow 700 begins with a script 702 that creates a CSV file 704. Scripts 706 and 708 can use the CSV file 704 to create an output file 710.

Table 3 lists example elements used in modeling the optimizer model. The optimizer model includes an object function, variables, and constraints.

TABLE 3

Elements Used in Modeling the Optimizer Model

| Elements | Description |
|---|---|
| Algorithm | Mixed integer non-linear programming with Standard Branch and Bound (SBB) |
| Object Function | Total cost of boilers fuels, purchased steams and power from third-party cogeneration units and desalted seawater (DW) make-up |
| Control Variables | Total boiler steam load<br>Individual STG inlet and out steam flow<br>Individual steam letdown flow<br>Individual steam vent condensing flow<br>Individual switchable driver running count |
| Dependent Variables | Total boiler fuel consumption<br>Total STG power generation<br>Total SEC export power<br>DW make-up flow<br>Steam condensate recovery amount<br>Steam and power consumption after drivers change |
| Constraints | Individual boiler minimum load<br>Individual STG casing flow per each stage<br>Total STG power higher than emergency power<br>Same steam imbalance<br>Same power imbalance<br>Same condensate imbalance |

Table 4 lists example equipment used in modeling:

TABLE 4

Equipment Used in Model

| Equipment | Description |
|---|---|
| Boilers | Minimum and maximum load of total 5 boilers to be calculated to check the acceptance of new set-point of boilers<br>Regressed boiler efficiency to be used to calculate boiler fuel consumption per load |
| Steam Turbine Generators (STGs) | Regressed STG equation to be used to calculate power generation as per throttling steam and extracted steam such as high pressure (HP) to STGs, medium pressure steam (MS) (RTR case 150 psig) from STGs, low low pressure steam (LLS) (RTR case 15 psig) from STGs, and steam condensate (SC) from STGs.<br>As STG is multi-stages, individual stage steam flows to be calculate to check not to over maximum casing steam flow. |
| Waste Heat Boilers (WHBs) | Total 22 waste heat boilers such as fired heaters convection section and SRUs steam generators against individual steam header to be counted as HP from WHBs, medium pressure (MP) from WHBs, and low pressure (LP) from WHBs. |
| Main Steam Turbines | Total 16 main steam turbines which do not have any alternative driver against individual steam headers to be counted. |
| Switchable Steam Turbines | Total 19 steam turbine - electric motor sets to be monitored to conduct selection optimization.<br>Steam consumption amount are calculated by multiplying the running counts with specific steam consumptions. (See FIG. 7B for examples of steam consumption values). |
| Deaerator | As there are no steam flow meter in deaerator, 13% of total supplied BFW is applied for estimating of deaerator steam flow as low pressure steam (LS) (RTR case 60 psig) to Deaerator. |
| Fuel Balance | Mixed fuel gas lower heating value (LHV) to be calculated with individual fuel stream such as purchased natural gas, tail gas, plant offgas.<br>Tail gas LHV to be defined as 3,000 British thermal units per standard cubic foot (BTU/SCF) due to variance.<br>Calculated mixed fuel gas LHV to be same with the field caloric meter value.<br>Hydrogen mole % in mixed fuel gas to be less than 30 mole % due to environment regulation.<br>Calculated mixed fuel gas LHV to be maintain the range of 820~850 BTU/SCF.<br>Fuel price to be input manually based on corporate energy price.<br>BTU/SCF gas, such as tail gas, is valued at 80% of the purchased fuel price.<br>(Imported Natural Gas + Produced Offgas) = Refinery Fuel Gas (RFG) + Refinery Pilot Gas (RPG) |
| Power Balance | Total power consumption to be calculated.<br>Total sales to others to be calculated.<br>Imported and exported to SEC to be calculated separately to check the power cost.<br>Loss from electric header to be included internal consumption<br>Loss = [Imported power from SEC + purchased power from two Cogen company + STG power] − [RasTanura Refinery (RTR) + RasTanura Terminal (RTT) + RasTanura Service of Community (RTSC) + Exported power to SEC)]<br>Power price to be inputted manually based on spilled power price. |
| Condensate Balance | Total 5 of PW consumption to be counted as PW Users.<br>Total 4 of LP BFW consumption to be counted as LPBFW Users.<br>Total 11 of HP BFW consumption to be counted as HPBFW Users.<br>Calculated Loss to be assumed as wasted water.<br>SC Balance = (DW from MEDs + SC from RecoveryHeader + LS to Deaerator) − (PW to Users + LPBFW to Users + HPBFW to USers) |
| Steam Balance | High pressure steam (HS) Balance = (HS from Boilers + HS from Cogens + HS from WHBs) − (HS to STGs + HS to MainTurbines + HS to Letdowns + HS to SwitchableTurbines + HS to Users) (RTR case 600 psig)<br>MS Balance = (MS from STGs + MS from Letdowns + MS from WHBs) − (MS to STGs + MS to Letdowns + MS to SwitchableTurbines + Ms to MEDs + MS to Users)<br>LS Balance = (LS from Letdowns + LS from WHBs + LS from MainTurbines) − (LS to Letdowns + LS to Deaerator + LS to Vent Condensers + LLS to Users)<br>LLS Balance = (LLS from STGs + LLS from Letdowns + LLS from SwitchableTurbines) − (LLS to Letdowns + LLS to Vent Condensers + LLS to Users) |
| Object Function | Fuel Expense = (Purchased Fuel Amount + Produced Offgas Amount) * Fuel Price + Tail Gas Amount * Fuel Price * 80%<br>Steam Expense = Imported Steam Amount from Cogens * Steam Price<br>Power Expense = Imported Power Amount from Cogens * Steam Price<br>Power from STGs is excluded, because steam is supplied to STG. |

As shown in Table 4, RFG provides the main fuel gas for firing, and RPG provides the pilot fuel gas for a pilot burner. Normally, two fuel sources are needed for any heater. During start-up, the pilot burner is used to start the pilot burner, from which the main burner can be fired. The use of RFG and RPG prevents the accumulation of the residual fuel source.

FIG. 7B shows a table 750 listing examples of steam and power consumption values and equipment running counts for steam turbine and electric motor sets, according to some implementations of the present disclosure. Normally, industrial drivers such as compressors and pumps use steam turbines and electric motors. The use can include, for example, High pressure Steam (HS), Medium pressure Steam (MS), Low pressure Steam (LS), and Low Low pressure Steam corresponding to 600#, 150#, 60#, and 15#, respectively. Corresponding running values include, for example, J93-F10X (total running of steam turbine and electric motor=3, current running of steam turbine=2, minimum running of steam turbine=1, maximum running of steam turbine=2) consuming 53 MLBH of 600# and extracting 53 MLBH of 150#. The electric motor can consume, for example, 0.969 MW/hr. The mark of "HM", "HL", "FILL", "ML" means "HS to MS", "HS to LS", "HS to LLS," and "MS to LS." The predefined 0 and 1 values are used for matrix calculation for steam balance.

Figure 8A:
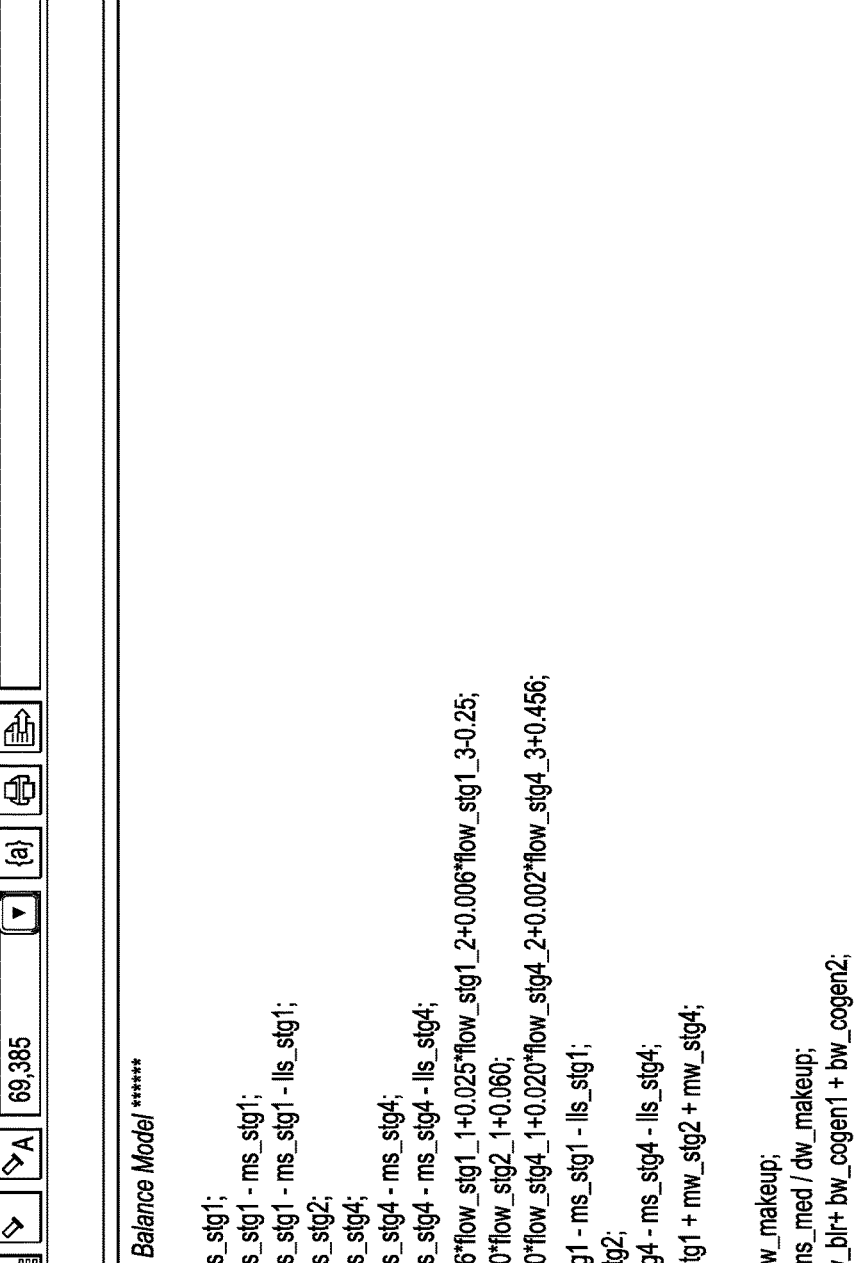

FIGS. 8A and 8B are screen shots 800a and 800b listing an example of code used for a developed optimizer system, according to some implementations of the present disclosure. In some implementations, about 1700 lines of GAMS code can suffice for the developed optimizer system. The system can be used, for example, for monitored current and optimum values.

After development of GAMS framework and model, 5 months of test operation was conducted to check any problems and system performance. Following trend shows the solver status and the model status generated from GAMS Optimizer. Value 1 of RBOSTATUS1 means "Normal termination" for Solver and Value 1 of RBOSTATUS2 means "Optimal solution achieved" for model.

Figure 9A:
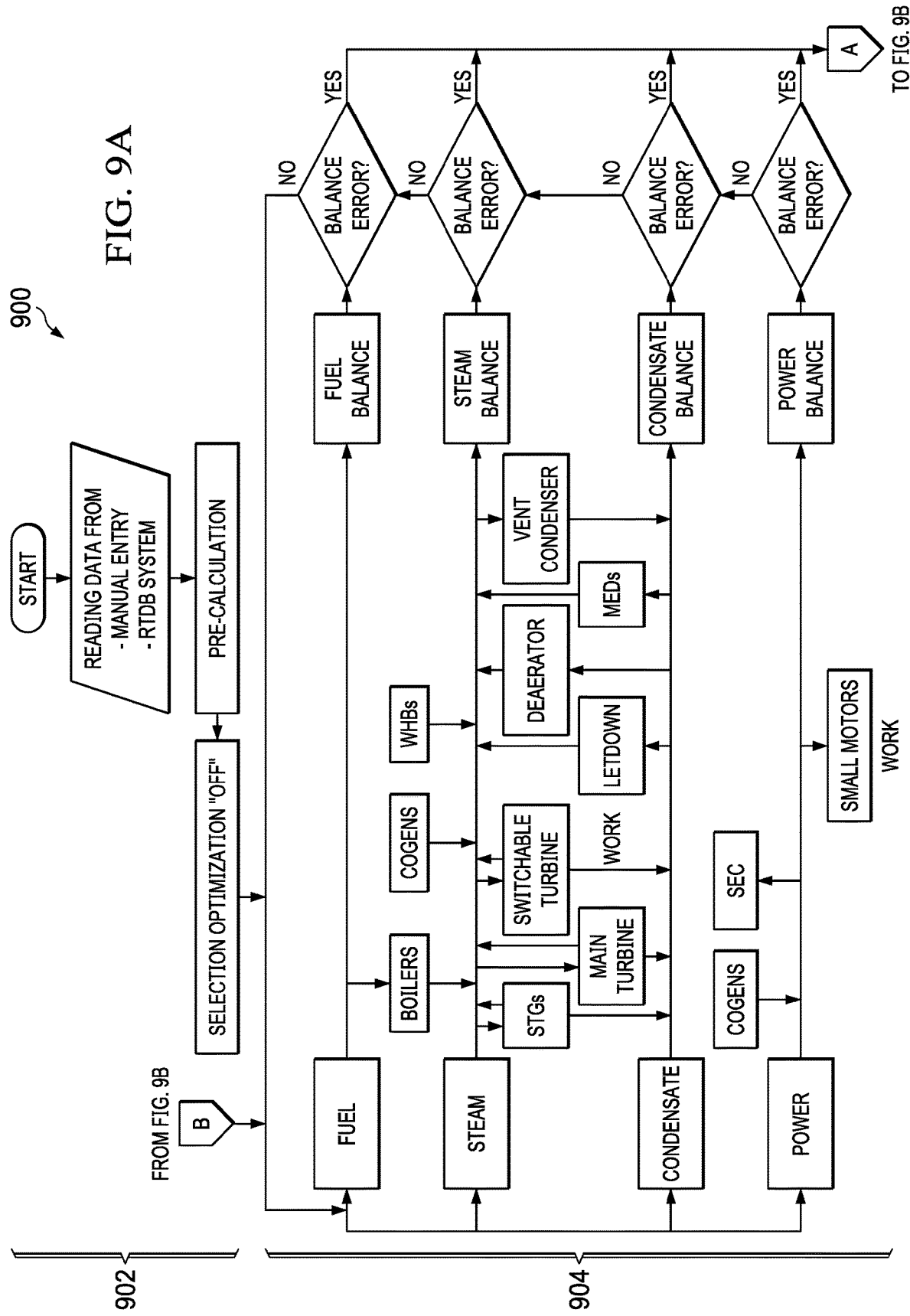
FIGS. 9A-9B collectively illustrate a flow diagram showing an example of a method for optimization, according to some implementations of the present disclosure.
Figure 9B:
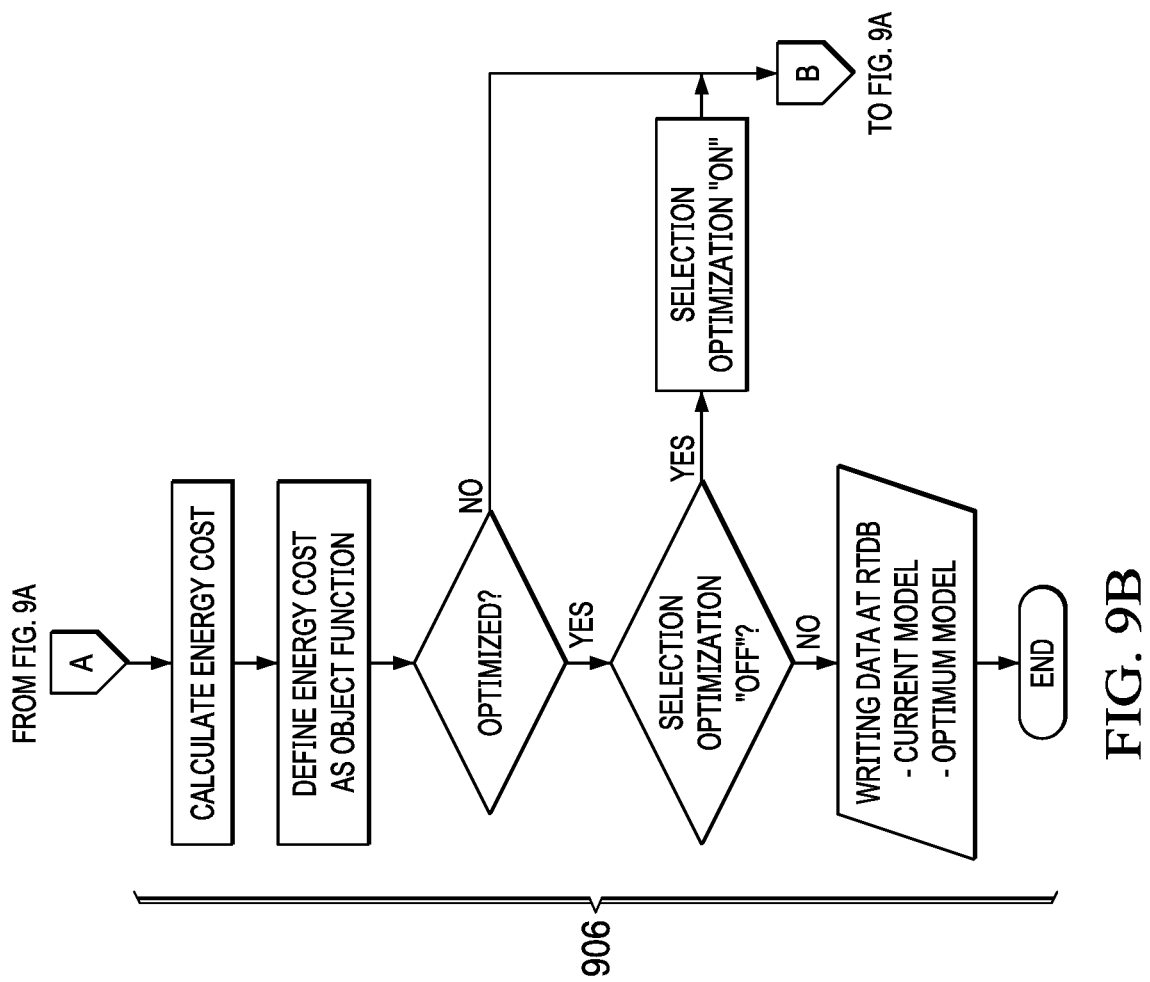

FIGS. 9A-9B collectively illustrate a flow diagram showing an example of a method 900 for optimization, according to some implementations of the present disclosure. The method 900 includes steps in an initialization phase 902 in which initial readings are obtained and recorded and pre-calculations are made, and optimization is initially set to OFF. Steps in a processing phase 904 are used for balancing fuel, steam, condensate, and power. Steps in a phase 906 are used to determine if steps in the processing phase 904 need to be repeated to achieve optimization with optimization set to ON for a second pass through the steps in the processing phase 904.

Figure 10A:
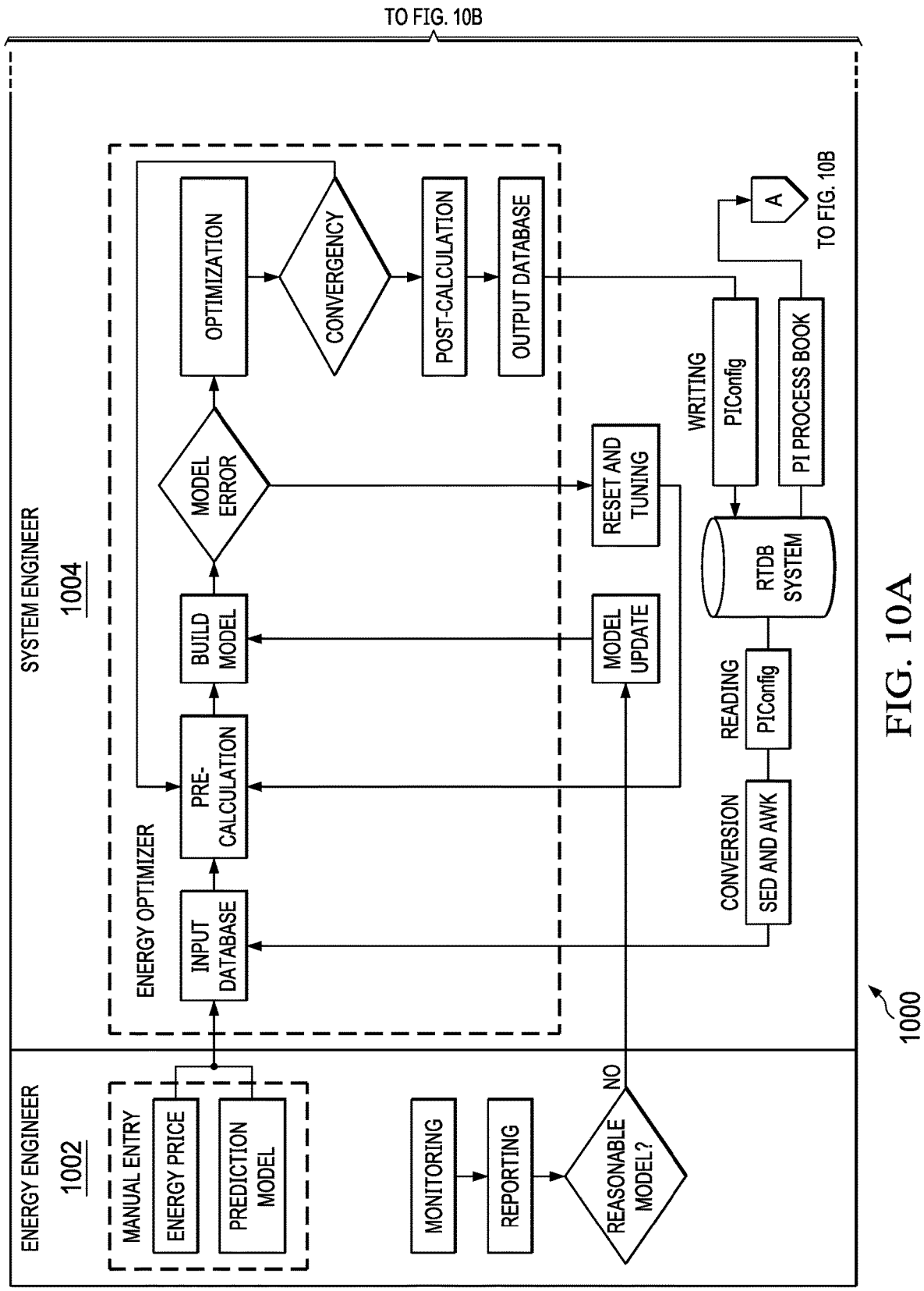
FIGS. 10A-10B collectively illustrate an activity diagram showing an example of a process for providing steam and condensate balance, according to some implementations of the present disclosure.
Figure 10B:
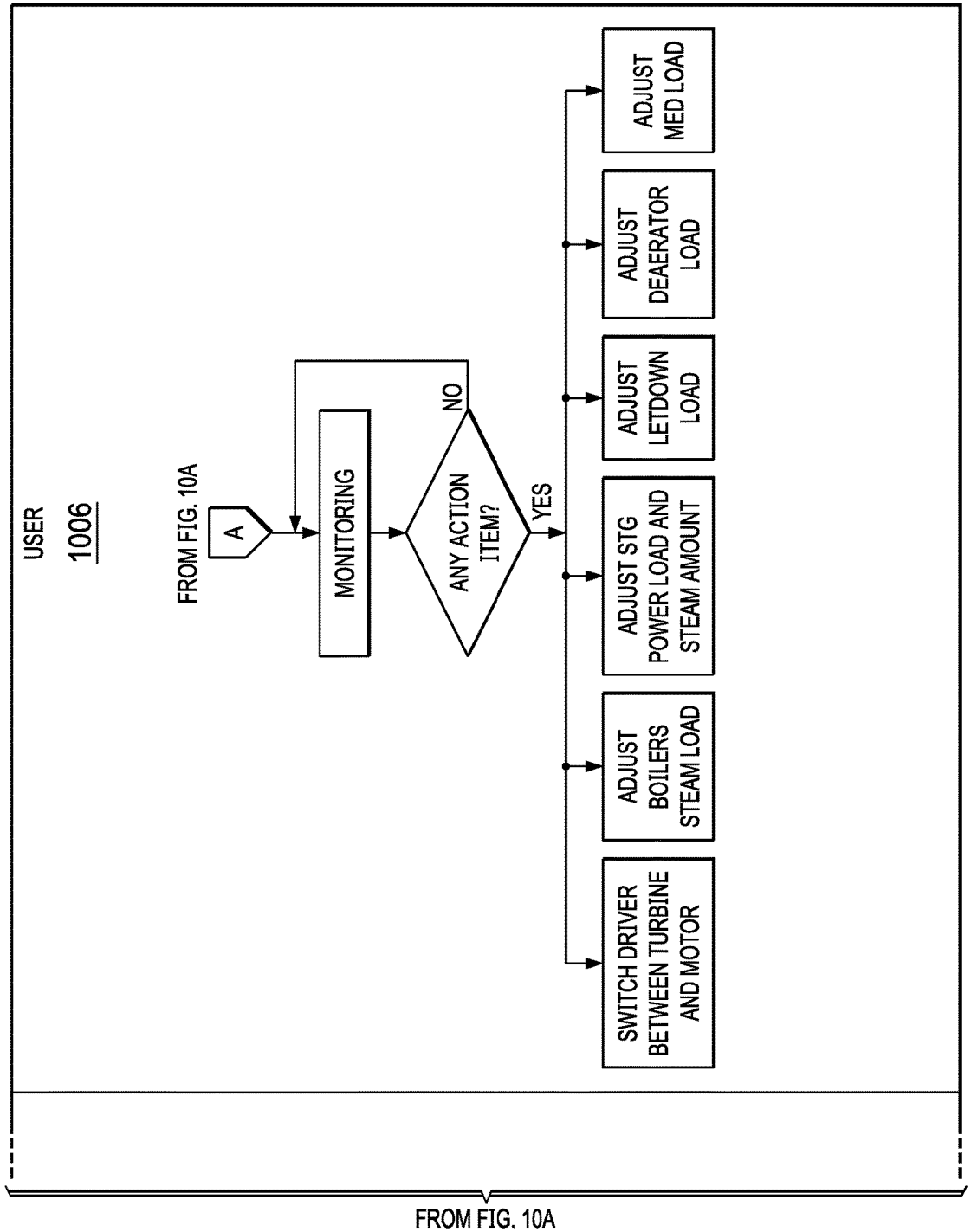

FIGS. 10A-10B collectively illustrate an activity diagram showing an example of a process 1000 for providing steam and condensate balance, according to some implementations of the present disclosure. The process 1000 includes energy engineer tasks 1002, system engineer tasks 1004, and user tasks such as console operators and field operators 1006.

Figure 11:
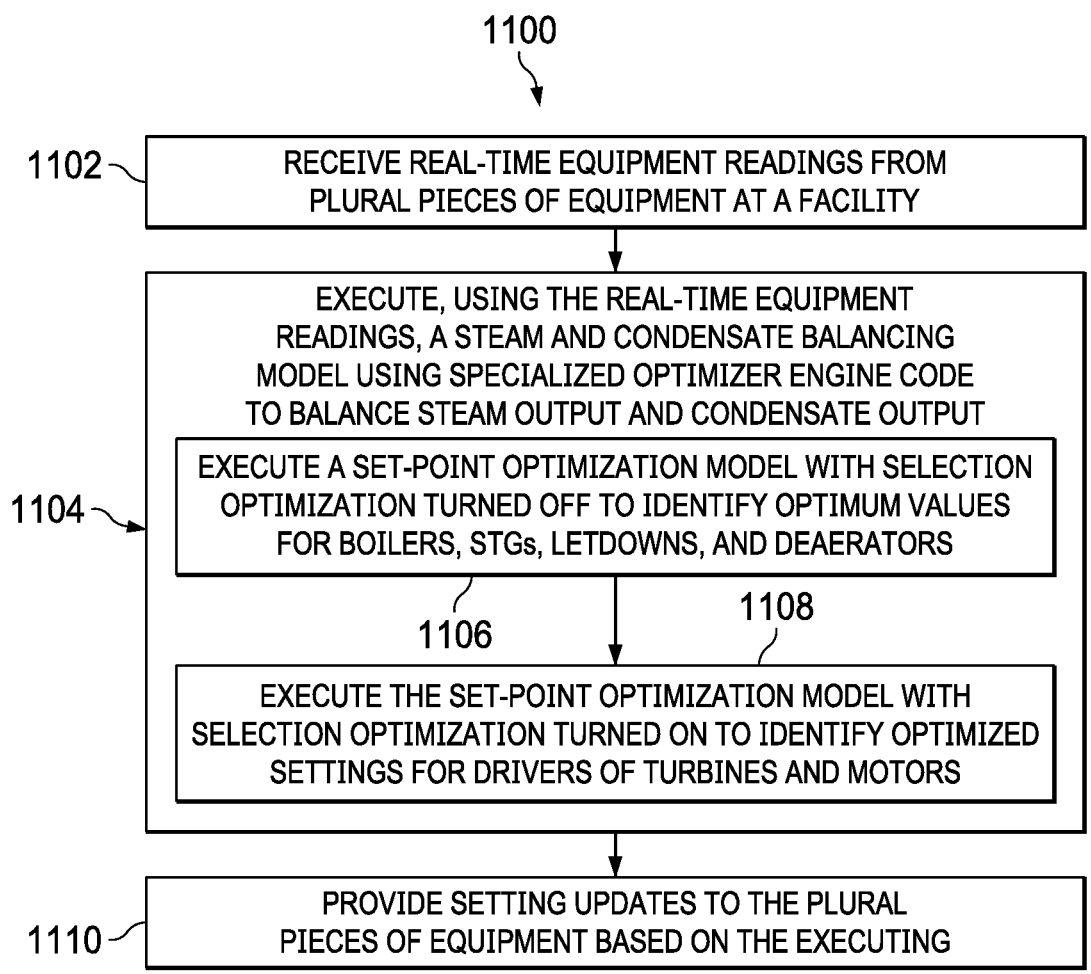
FIG. 11 is a flowchart of an example method for using an optimization model to balance steam and condensate, according to some implementations of the present disclosure.

FIG. 11 is a flowchart of an example method 1100 for using an optimization model to balance steam and condensate, according to some implementations of the present disclosure. For clarity of presentation, the description that follows generally describes method 1100 in the context of the other figures in this description. However, it will be understood that method 1100 can be performed, for example, by any suitable system, environment, software, and hardware, or a combination of systems, environments, software, and hardware, as appropriate. In some implementations, various steps of method 1100 can be run in parallel, in combination, in loops, or in any order.

At 1102, real-time equipment readings are received from plural pieces of equipment at a facility. For example, equipment readings can be received from the plural pieces of equipment shown in FIGS. 1A-1B, including boilers, STGs, waste heat boilers, main steam turbines, switchable steam turbines, and deaerators. From 1102, method 1100 proceeds to 1104.

At 1104, a steam and condensate balancing model is executed using the real-time equipment readings. The steam and condensate balancing model uses specialized optimizer engine code to balance steam output and condensate output. The steam and condensate balancing model that is executed can use code listed in FIGS. 8A and 8B, for example. In some implementations, executing the steam and condensate balancing model includes steps 1106 and 1108.

At 1106, a set-point optimization model is executed with selection optimization turned off to identify optimum values for boilers, STGs, letdowns, and deaerators. For example, the 904. As an example, steps in a processing phase 904 (for balancing fuel, steam, condensate, and power) can be executed with optimization initially set to OFF. From 1106, method 1100 proceeds to 1108.

At 1108, the set-point optimization model is executed with selection optimization turned on to identify optimized settings for drivers of turbines and motors. For example, steps in the processing phase 904 can be repeated optimization set to ON for a second pass through the steps in the processing phase 904. From 1108, method 1100 proceeds to 1110.

At 1110, setting updates are provided to the plural pieces of equipment based on the executing. In some implementations, providing the setting updates to the plural pieces of equipment can include using online communications (for example, using one or both of DCS and supervisory control and data acquisition (SCADA) systems). In some implementations, providing the setting updates to the plural pieces of equipment can include using offline communications (for example, using one or both of advanced process control (APC) and multi-variable control (MVC) systems).

In some implementations, providing the setting updates to the plural pieces of equipment can include providing the setting updates for display in a web browser or in user interface of a PI system. For example, providing the setting updates can include: 1) providing suggested settings for presentation to a user (for example, in a user interface); 2) receiving a user selection of one or more of the suggested settings; and 3) implementing the one or more of the suggested settings by sending commands to corresponding ones of the plural pieces of equipment based on the user selection (for example, using online or offline communications). After 1110, method 1100 can stop.

Figure 12:
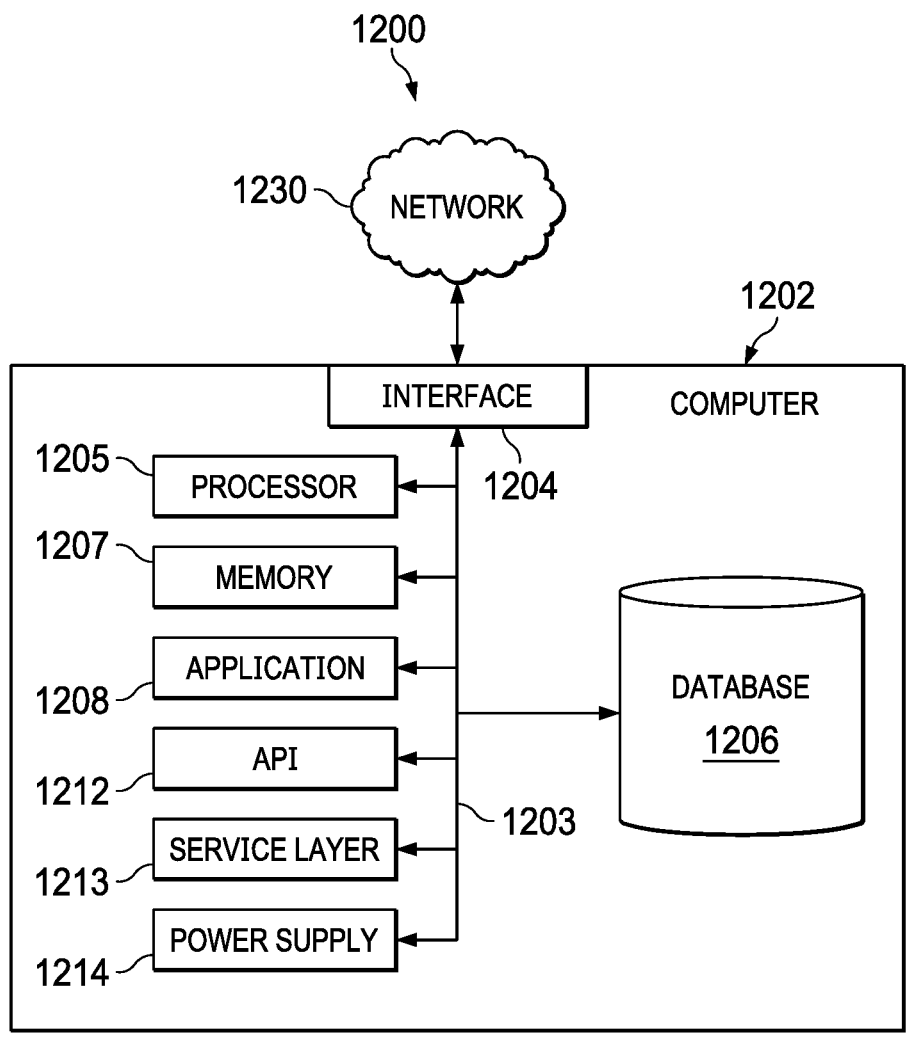
FIG. 12 is a block diagram illustrating an example computer system used to provide computational functionalities associated with described algorithms, methods, functions, processes, flows, and procedures as described in the present disclosure, according to some implementations of the present disclosure.

FIG. 12 is a block diagram of an example computer system 1200 used to provide computational functionalities associated with described algorithms, methods, functions, processes, flows, and procedures described in the present disclosure, according to some implementations of the present disclosure. The illustrated computer 1202 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1202 can include input devices such as keypads, keyboards, and touch screens that can accept user information. Also, the computer 1202 can include output devices that can convey information associated with the operation of the computer 1202. The information can include digital data, visual data, audio information, or a combination of information. The information can be presented in a graphical user interface (UI) (or GUI).

The computer 1202 can serve in a role as a client, a network component, a server, a database, a persistency, or components of a computer system for performing the subject matter described in the present disclosure. The illustrated computer 1202 is communicably coupled with a network 1230. In some implementations, one or more components of the computer 1202 can be configured to operate within different environments, including cloud-computing-based environments, local environments, global environments, and combinations of environments.

At a top level, the computer 1202 is an electronic computing device operable to receive, transmit, process, store, and manage data and information associated with the described subject matter. According to some implementations, the computer 1202 can also include, or be communicably coupled with, an application server, an email server, a web server, a caching server, a streaming data server, or a combination of servers.

The computer 1202 can receive requests over network 1230 from a client application (for example, executing on another computer 1202). The computer 1202 can respond to the received requests by processing the received requests using software applications. Requests can also be sent to the computer 1202 from internal users (for example, from a command console), external (or third) parties, automated applications, entities, individuals, systems, and computers.

Each of the components of the computer 1202 can communicate using a system bus 1203. In some implementations, any or all of the components of the computer 1202, including hardware or software components, can interface with each other or the interface 1204 (or a combination of both) over the system bus 1203. Interfaces can use an application programming interface (API) 1212, a service layer 1213, or a combination of the API 1212 and service layer 1213. The API 1212 can include specifications for routines, data structures, and object classes. The API 1212 can be either computer-language independent or dependent. The API 1212 can refer to a complete interface, a single function, or a set of APIs.

The service layer 1213 can provide software services to the computer 1202 and other components (whether illustrated or not) that are communicably coupled to the computer 1202. The functionality of the computer 1202 can be accessible for all service consumers using this service layer. Software services, such as those provided by the service layer 1213, can provide reusable, defined functionalities through a defined interface. For example, the interface can be software written in JAVA, C++, or a language providing data in extensible markup language (XML) format. While illustrated as an integrated component of the computer 1202, in alternative implementations, the API 1212 or the service layer 1213 can be stand-alone components in relation to other components of the computer 1202 and other components communicably coupled to the computer 1202. Moreover, any or all parts of the API 1212 or the service layer 1213 can be implemented as child or sub-modules of another software module, enterprise application, or hardware module without departing from the scope of the present disclosure.

The computer 1202 includes an interface 1204. Although illustrated as a single interface 1204 in FIG. 12, two or more interfaces 1204 can be used according to particular needs, desires, or particular implementations of the computer 1202 and the described functionality. The interface 1204 can be used by the computer 1202 for communicating with other systems that are connected to the network 1230 (whether illustrated or not) in a distributed environment. Generally, the interface 1204 can include, or be implemented using, logic encoded in software or hardware (or a combination of software and hardware) operable to communicate with the network 1230. More specifically, the interface 1204 can include software supporting one or more communication protocols associated with communications. As such, the network 1230 or the interface's hardware can be operable to communicate physical signals within and outside of the illustrated computer 1202.

The computer 1202 includes a processor 1205. Although illustrated as a single processor 1205 in FIG. 12, two or more processors 1205 can be used according to particular needs, desires, or particular implementations of the computer 1202 and the described functionality. Generally, the processor 1205 can execute instructions and can manipulate data to perform the operations of the computer 1202, including operations using algorithms, methods, functions, processes, flows, and procedures as described in the present disclosure.

The computer 1202 also includes a database 1206 that can hold data for the computer 1202 and other components connected to the network 1230 (whether illustrated or not). For example, database 1206 can be an in-memory, conventional, or a database storing data consistent with the present disclosure. In some implementations, database 1206 can be a combination of two or more different database types (for example, hybrid in-memory and conventional databases) according to particular needs, desires, or particular implementations of the computer 1202 and the described functionality. Although illustrated as a single database 1206 in FIG. 12, two or more databases (of the same, different, or combination of types) can be used according to particular needs, desires, or particular implementations of the computer 1202 and the described functionality. While database 1206 is illustrated as an internal component of the computer 1202, in alternative implementations, database 1206 can be external to the computer 1202.

The computer 1202 also includes a memory 1207 that can hold data for the computer 1202 or a combination of components connected to the network 1230 (whether illustrated or not). Memory 1207 can store any data consistent with the present disclosure. In some implementations, memory 1207 can be a combination of two or more different types of memory (for example, a combination of semiconductor and magnetic storage) according to particular needs, desires, or particular implementations of the computer 1202 and the described functionality. Although illustrated as a single memory 1207 in FIG. 12, two or more memories 1207 (of the same, different, or combination of types) can be used according to particular needs, desires, or particular implementations of the computer 1202 and the described functionality. While memory 1207 is illustrated as an internal component of the computer 1202, in alternative implementations, memory 1207 can be external to the computer 1202.

The application 1208 can be an algorithmic software engine providing functionality according to particular needs, desires, or particular implementations of the computer 1202 and the described functionality. For example, application 1208 can serve as one or more components, modules, or applications. Further, although illustrated as a single application 1208, the application 1208 can be implemented as multiple applications 1208 on the computer 1202. In addition, although illustrated as internal to the computer 1202, in alternative implementations, the application 1208 can be external to the computer 1202.

The computer 1202 can also include a power supply 1214. The power supply 1214 can include a rechargeable or non-rechargeable battery that can be configured to be either user- or non-user-replaceable. In some implementations, the power supply 1214 can include power-conversion and management circuits, including recharging, standby, and power management functionalities. In some implementations, the power-supply 1214 can include a power plug to allow the computer 1202 to be plugged into a wall socket or a power source to, for example, power the computer 1202 or recharge a rechargeable battery.

There can be any number of computers 1202 associated with, or external to, a computer system containing computer 1202, with each computer 1202 communicating over network 1230. Further, the terms "client," "user," and other appropriate terminology can be used interchangeably, as appropriate, without departing from the scope of the present disclosure. Moreover, the present disclosure contemplates that many users can use one computer 1202 and one user can use multiple computers 1202.

Described implementations of the subject matter can include one or more features, alone or in combination.

For example, in a first implementation, a computer-implemented method includes the following. Real-time equipment readings are received from plural pieces of equipment at a facility. A steam and condensate balancing model is executed using the real-time equipment readings. The steam and condensate balancing model uses specialized optimizer engine code to balance steam output and condensate output. A set-point optimization model is executed with selection optimization turned off to identify optimum values for boilers, STGs, letdowns, and deaerators. The set-point optimization model is executed with selection optimization turned on to identify optimized settings for drivers of turbines and motors. Setting updates are provided to the plural pieces of equipment based on the executing.

The foregoing and other described implementations can each, optionally, include one or more of the following features:

A first feature, combinable with any of the following features, where the plural pieces of equipment include boilers, STGs, waste heat boilers, main steam turbines, switchable steam turbines, and deaerators.

A second feature, combinable with any of the previous or following features, where providing the setting updates to the plural pieces of equipment includes using online communications.

A third feature, combinable with any of the previous or following features, where using online communications includes communicating using one or both of distributed control system (DCS) and supervisory control and data acquisition (SCADA) systems.

A fourth feature, combinable with any of the previous or following features, where providing the setting updates to the plural pieces of equipment includes using offline communications.

A fifth feature, combinable with any of the previous or following features, where using offline communications includes communicating using one or both of advanced process control (APC) and multi-variable control (MVC) systems.

A sixth feature, combinable with any of the previous or following features, where providing the setting updates to the plural pieces of equipment includes providing the setting updates for display in a web browser or in user interface of a plant information (PI) system.

A seventh feature, combinable with any of the previous or following features, where providing the setting updates includes providing suggested settings for presentation to a user, receiving a user selection of one or more of the suggested settings, and implementing the one or more of the suggested settings by sending commands to corresponding ones of the plural pieces of equipment based on the user selection.

In a second implementation, a non-transitory, computer-readable medium storing one or more instructions executable by a computer system to perform operations including the following. Real-time equipment readings are received from plural pieces of equipment at a facility. A steam and condensate balancing model is executed using the real-time equipment readings. The steam and condensate balancing model uses specialized optimizer engine code to balance steam output and condensate output. A set-point optimization model is executed with selection optimization turned off to identify optimum values for boilers, STGs, letdowns, and deaerators. The set-point optimization model is executed with selection optimization turned on to identify optimized settings for drivers of turbines and motors. Setting updates are provided to the plural pieces of equipment based on the executing.

The foregoing and other described implementations can each, optionally, include one or more of the following features:

A first feature, combinable with any of the following features, where the plural pieces of equipment include boilers, STGs, waste heat boilers, main steam turbines, switchable steam turbines, and deaerators.

A second feature, combinable with any of the previous or following features, where providing the setting updates to the plural pieces of equipment includes using online communications.

A third feature, combinable with any of the previous or following features, where using online communications includes communicating using one or both of distributed control system (DCS) and supervisory control and data acquisition (SCADA) systems.

A fourth feature, combinable with any of the previous or following features, where providing the setting updates to the plural pieces of equipment includes using offline communications.

A fifth feature, combinable with any of the previous or following features, where using offline communications includes communicating using one or both of advanced process control (APC) and multi-variable control (MVC) systems.

A sixth feature, combinable with any of the previous or following features, where providing the setting updates to the plural pieces of equipment includes providing the setting updates for display in a web browser or in user interface of a plant information (PI) system.

A seventh feature, combinable with any of the previous or following features, where providing the setting updates includes providing suggested settings for presentation to a user, receiving a user selection of one or more of the suggested settings, and implementing the one or more of the suggested settings by sending commands to corresponding ones of the plural pieces of equipment based on the user selection.

In a third implementation, a computer-implemented system, including one or more processors and a non-transitory computer-readable storage medium coupled to the one or more processors and storing programming instructions for execution by the one or more processors, the programming instructions instructing the one or more processors to perform operations including the following. Real-time equipment readings are received from plural pieces of equipment at a facility. A steam and condensate balancing model is executed using the real-time equipment readings. The steam and condensate balancing model uses specialized optimizer engine code to balance steam output and condensate output. A set-point optimization model is executed with selection optimization turned off to identify optimum values for boilers, STGs, letdowns, and deaerators. The set-point optimization model is executed with selection optimization turned on to identify optimized settings for drivers of turbines and motors. Setting updates are provided to the plural pieces of equipment based on the executing.

The foregoing and other described implementations can each, optionally, include one or more of the following features:

A first feature, combinable with any of the following features, where the plural pieces of equipment include boilers, STGs, waste heat boilers, main steam turbines, switchable steam turbines, and deaerators.

A second feature, combinable with any of the previous or following features, where providing the setting updates to the plural pieces of equipment includes using online communications.

A third feature, combinable with any of the previous or following features, where using online communications includes communicating using one or both of distributed control system (DCS) and supervisory control and data acquisition (SCADA) systems.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
receiving real-time equipment readings from plural pieces of equipment at a facility;
executing, using the real-time equipment readings, a steam and condensate balancing model using specialized optimizer engine code to balance steam output and condensate output, including:
   executing, with optimization initially set to OFF, a set-point optimization model with selection optimization turned off to identify optimum values for boilers, steam turbine generators (STGs), letdowns, and deaerators; and
   executing, with optimization set to ON and automatically in response to executing the set-point optimization model with optimization initially set to OFF, the set-point optimization model with selection optimization turned on to identify optimized settings for drivers of turbines and motors, wherein the optimized settings for drivers of the turbines and motors are identified using the identified optimum values for the boilers, STGs, letdowns, and deaerators; and
providing setting updates to the plural pieces of equipment based on the executing.

2. The computer-implemented method of claim 1, wherein the plural pieces of equipment include boilers, STGs, waste heat boilers, main steam turbines, switchable steam turbines, and deaerators.

3. The computer-implemented method of claim 1, wherein providing the setting updates to the plural pieces of equipment includes using online communications.

4. The computer-implemented method of claim 3, wherein using online communications includes communicating using one or both of distributed control system (DCS) and supervisory control and data acquisition (SCADA) systems.

5. The computer-implemented method of claim 1, wherein providing the setting updates to the plural pieces of equipment includes using offline communications.

6. The computer-implemented method of claim 5, wherein using offline communications includes communicating using one or both of advanced process control (APC) and multi-variable control (MVC) systems.

7. The computer-implemented method of claim 1, wherein providing the setting updates to the plural pieces of equipment includes providing the setting updates for display in a web browser or in user interface of a plant information (PI) system.

8. The computer-implemented method of claim 1, wherein providing the setting updates includes:
providing suggested settings for presentation to a user;
receiving a user selection of one or more of the suggested settings; and
implementing the one or more of the suggested settings by sending commands to corresponding ones of the plural pieces of equipment based on the user selection.

9. A non-transitory, computer-readable medium storing one or more instructions executable by a computer system to perform operations comprising:
receiving real-time equipment readings from plural pieces of equipment at a facility;
executing, using the real-time equipment readings, a steam and condensate balancing model using specialized optimizer engine code to balance steam output and condensate output, including:
   executing, with optimization initially set to OFF, a set-point optimization model with selection optimization turned off to identify optimum values for boilers, steam turbine generators (STGs), letdowns, and deaerators; and
   executing, with optimization set to ON and automatically in response to executing the set-point optimization model with optimization initially set to OFF, the set-point optimization model with selection optimization turned on to identify optimized settings for drivers of turbines and motors, wherein the optimized settings for drivers of the turbines and motors are identified using the identified optimum values for the boilers, STGs, letdowns, and deaerators; and
providing setting updates to the plural pieces of equipment based on the executing.

10. The non-transitory, computer-readable medium of claim 9, wherein the plural pieces of equipment include boilers, STGs, waste heat boilers, main steam turbines, switchable steam turbines, and deaerators.

11. The non-transitory, computer-readable medium of claim 9, wherein providing the setting updates to the plural pieces of equipment includes using online communications.

12. The non-transitory, computer-readable medium of claim 11, wherein using online communications includes communicating using one or both of distributed control system (DCS) and supervisory control and data acquisition (SCADA) systems.

13. The non-transitory, computer-readable medium of claim 9, wherein providing the setting updates to the plural pieces of equipment includes using offline communications.

14. The non-transitory, computer-readable medium of claim 13, wherein using offline communications includes communicating using one or both of advanced process control (APC) and multi-variable control (MVC) systems.

15. The non-transitory, computer-readable medium of claim 9, wherein providing the setting updates to the plural pieces of equipment includes providing the setting updates for display in a web browser or in user interface of a plant information (PI) system.

16. The non-transitory, computer-readable medium of claim 9, wherein providing the setting updates includes:
providing suggested settings for presentation to a user;
receiving a user selection of one or more of the suggested settings; and
implementing the one or more of the suggested settings by sending commands to corresponding ones of the plural pieces of equipment based on the user selection.

17. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
receiving real-time equipment readings from plural pieces of equipment at a facility;
executing, using the real-time equipment readings, a steam and condensate balancing model using specialized optimizer engine code to balance steam output and condensate output, including:

executing, with optimization initially set to OFF, a set-point optimization model with selection optimization turned off to identify optimum values for boilers, steam turbine generators (STGs), letdowns, and deaerators; and executing, with optimization set to ON and automatically in response to executing the set-point optimization model with optimization initially set to OFF, the set-point optimization model with selection optimization turned on to identify optimized settings for drivers of turbines and motors, wherein the optimized settings for drivers of the turbines and motors are identified using the identified optimum values for the boilers, STGs, letdowns, and deaerators; and providing setting updates to the plural pieces of equipment based on the executing.

18. The computer-implemented system of claim 17, wherein the plural pieces of equipment include boilers, STGs, waste heat boilers, main steam turbines, switchable steam turbines, and deaerators.

19. The computer-implemented system of claim 17, wherein providing the setting updates to the plural pieces of equipment includes using online communications.

20. The computer-implemented system of claim 19, wherein using online communications includes communicating using one or both of distributed control system (DCS) and supervisory control and data acquisition (SCADA) systems.

\* \* \* \* \*